United States Patent
Fang et al.

(10) Patent No.: US 7,724,692 B1
(45) Date of Patent: *May 25, 2010

(54) METHOD AND APPARATUS FOR AUTONEGOTIATION BETWEEN NETWORK DEVICES

(75) Inventors: Calvin Fang, Milpitas, CA (US); Yi Cheng, San Jose, CA (US); William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 713 days.

This patent is subject to a terminal disclaimer.

(21) Appl. No.: 11/650,052

(22) Filed: Jan. 5, 2007

Related U.S. Application Data

(63) Continuation of application No. 10/099,050, filed on Mar. 15, 2002, now Pat. No. 7,161,911.

(60) Provisional application No. 60/280,735, filed on Apr. 3, 2001.

(51) Int. Cl.
*H04B 1/44* (2006.01)

(52) U.S. Cl. .................. 370/282; 370/419; 709/237

(58) Field of Classification Search .................. None
See application file for complete search history.

(56) References Cited

U.S. PATENT DOCUMENTS

| | | | |
|---|---|---|---|
| 4,780,714 A | 10/1988 | Moustakas et al. | |
| 5,032,819 A | 7/1991 | Sakiragi et al. | |
| 5,224,154 A | 6/1993 | Aldridge et al. | |
| 5,375,051 A | 12/1994 | Decker et al. | |
| 5,406,260 A | 4/1995 | Cummings et al. | |
| 5,410,535 A | 4/1995 | Yang et al. | |
| 5,414,708 A | 5/1995 | Webber et al. | |
| 5,577,023 A | 11/1996 | Marum et al. | |
| 5,799,069 A | 8/1998 | Weston et al. | |
| 5,809,026 A | 9/1998 | Wong et al. | |
| 5,848,376 A | 12/1998 | Steiner et al. | |
| 5,892,926 A | 4/1999 | Witkowski et al. | |
| 5,922,052 A * | 7/1999 | Heaton | 709/223 |
| 5,923,663 A | 7/1999 | Bontemps et al. | |
| 5,943,404 A | 8/1999 | Sansom et al. | |
| 6,175,865 B1 | 1/2001 | Dove et al. | |
| 6,243,756 B1 | 6/2001 | Whitmire et al. | |
| 6,272,552 B1 | 8/2001 | Melvin et al. | |
| 6,349,331 B1 * | 2/2002 | Andra et al. | 709/220 |
| 6,834,085 B1 | 12/2004 | Leonowich et al. | 375/316 |
| 2002/0027888 A1 | 3/2002 | Creigh | 370/282 |

(Continued)

FOREIGN PATENT DOCUMENTS

EP 00273080 A1 7/1988

(Continued)

OTHER PUBLICATIONS

U.S. Appl. No. 09/990,137, filed Nov. 21, 2001, Lo.

*Primary Examiner*—Duc C Ho

(57) ABSTRACT

A physical layer device comprises a transmitter of a first network device that transmits an autonegotiation signal to a second network device. A receiver of the first network device receives a received signal from the second network device. An autonegotiation controller autonegotiates link parameters for a link between the first network device and the second network device, monitors autonegotiation pulses in the autonegotiation signal relative to autonegotiation pulses in the received signal received during a window, and selectively blinds autonegotiation based on the monitoring.

16 Claims, 24 Drawing Sheets

U.S. PATENT DOCUMENTS

| | | | |
|---|---|---|---|
| 2002/0046267 A1 | 4/2002 | Andra et al. | 709/220 |
| 2005/0128056 A1 | 6/2005 | Browning | 340/286 |
| 2008/0033670 A1* | 2/2008 | Rakshani et al. | 702/60 |

FOREIGN PATENT DOCUMENTS

| | | |
|---|---|---|
| EP | 00577435 A1 | 7/1993 |
| EP | 00596523 A2 | 5/1994 |
| EP | 00596523 A3 | 1/1996 |
| EP | 00577435 B1 | 2/1999 |
| WO | WO 9413072 A1 | 6/1994 |
| WO | WO 9619877 A1 | 6/1996 |
| WO | WO 0054419 A1 | 9/2000 |
| WO | WO 01/11861 A2 | 2/2001 |

\* cited by examiner

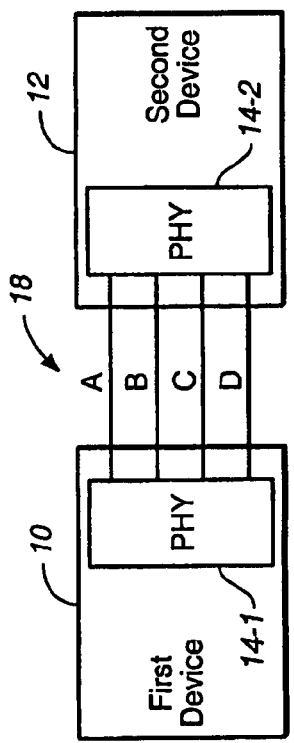
FIG._1
*(PRIOR ART)*
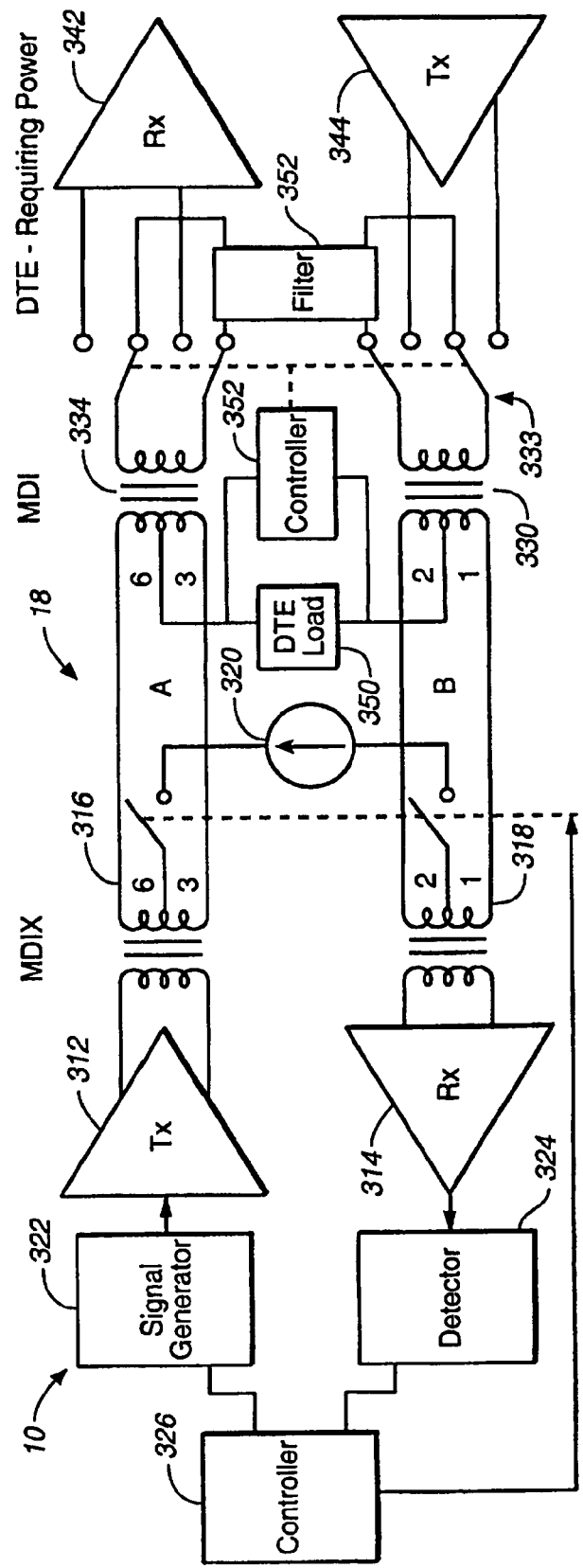
FIG._2

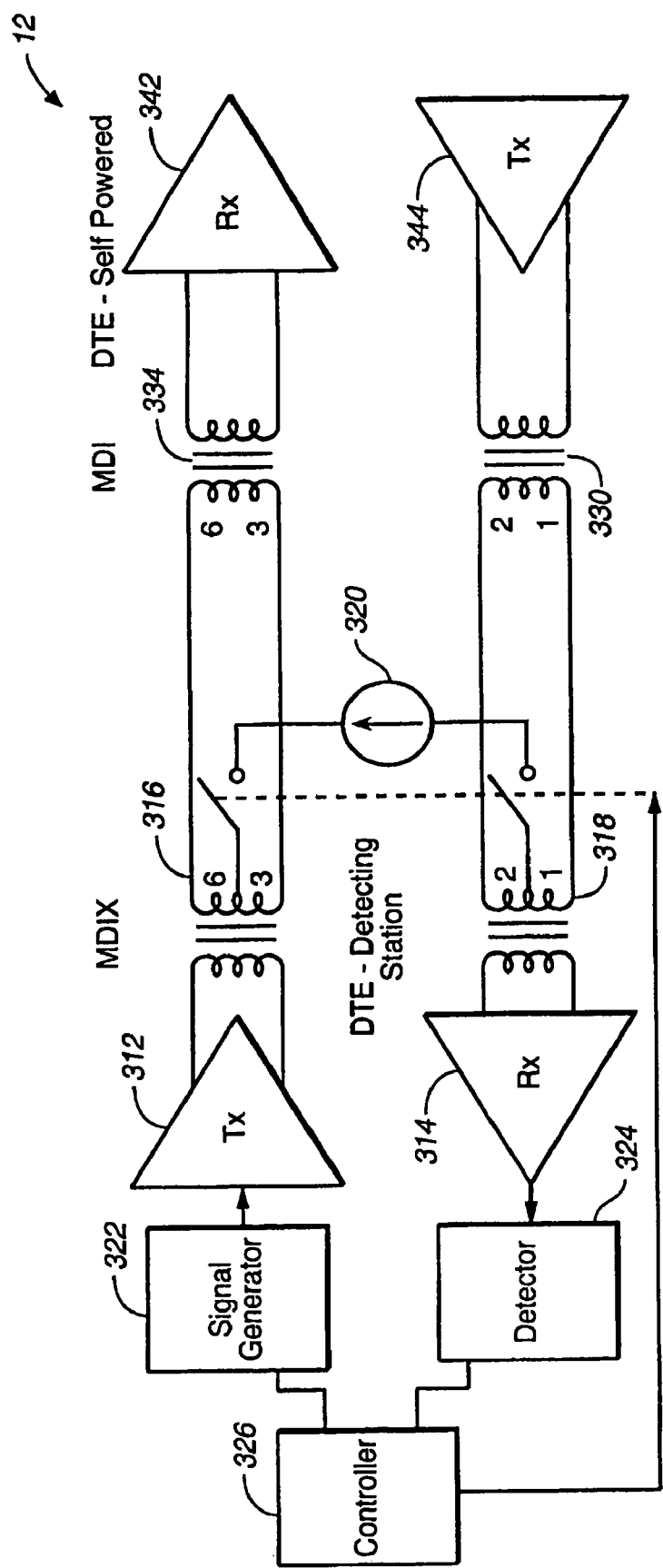
FIG._2A

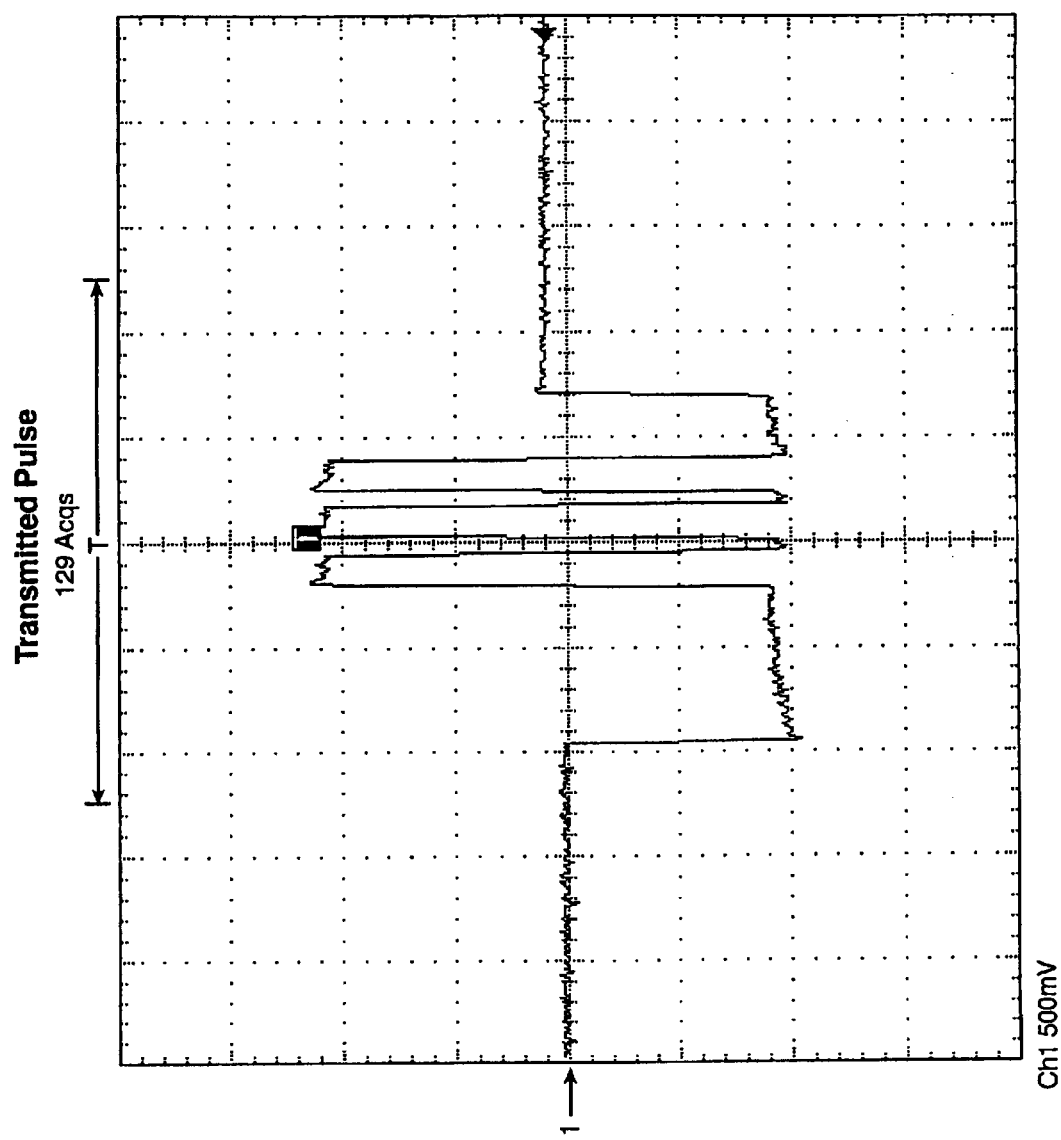

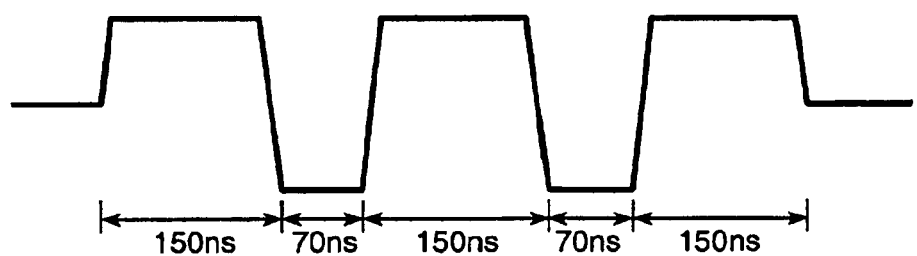
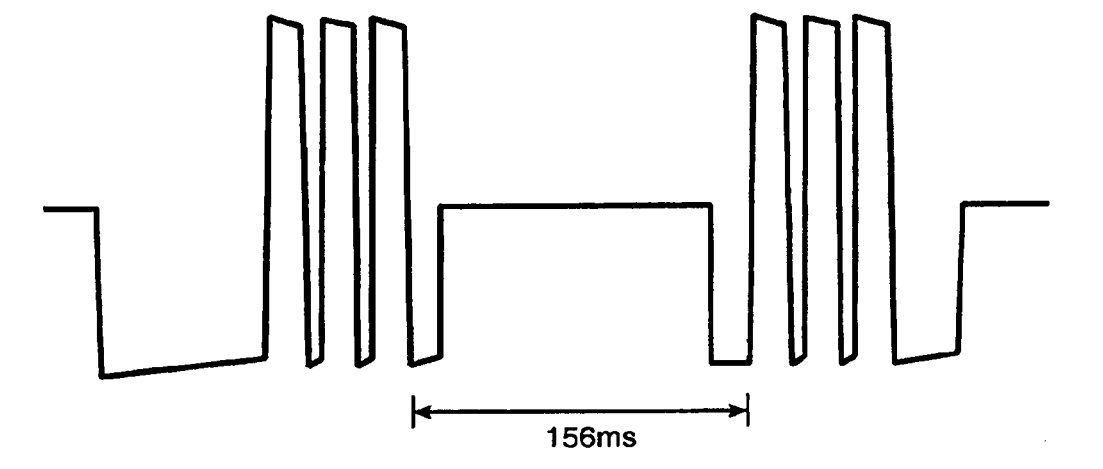
FIG._3B

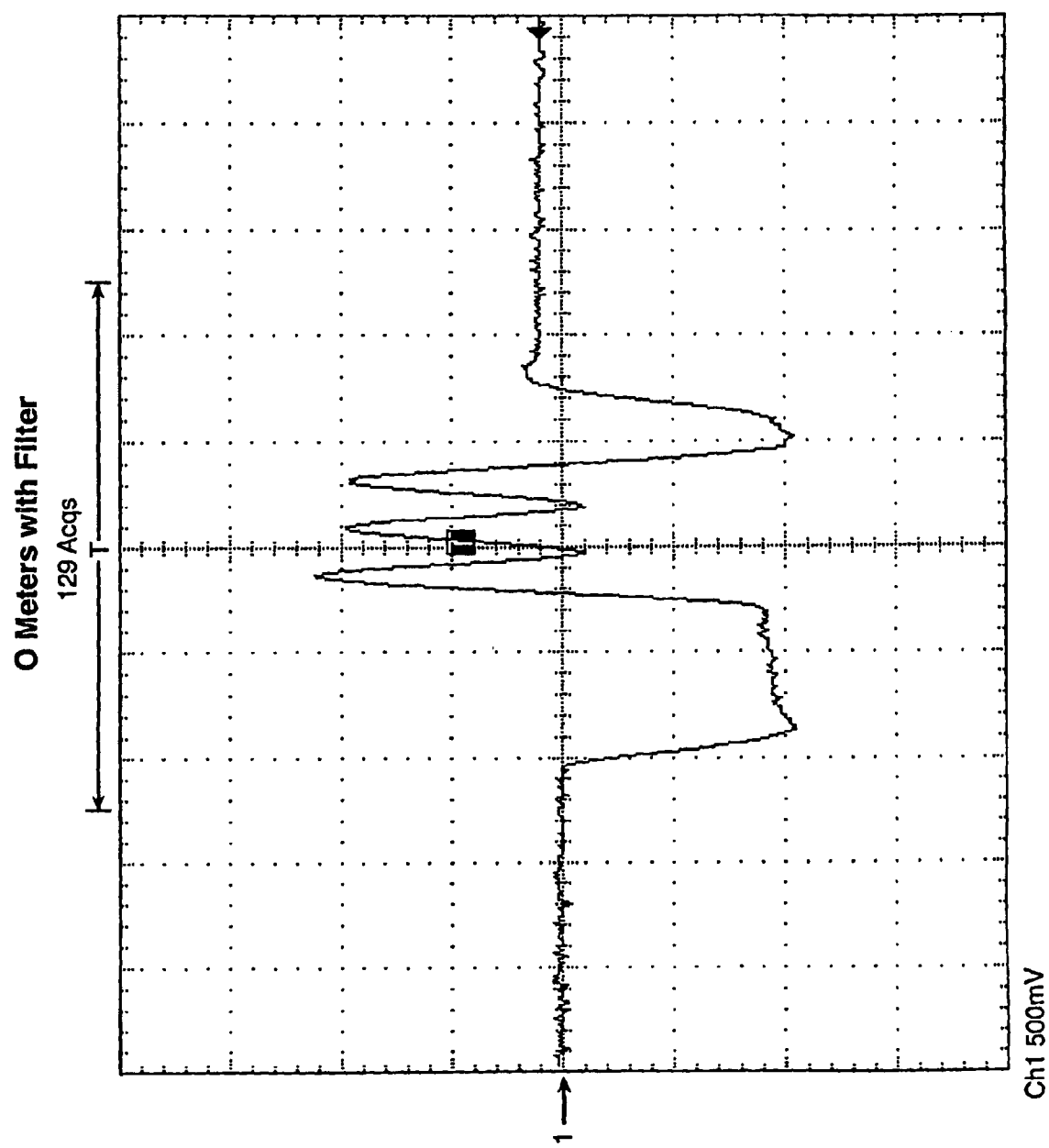
FIG._4A

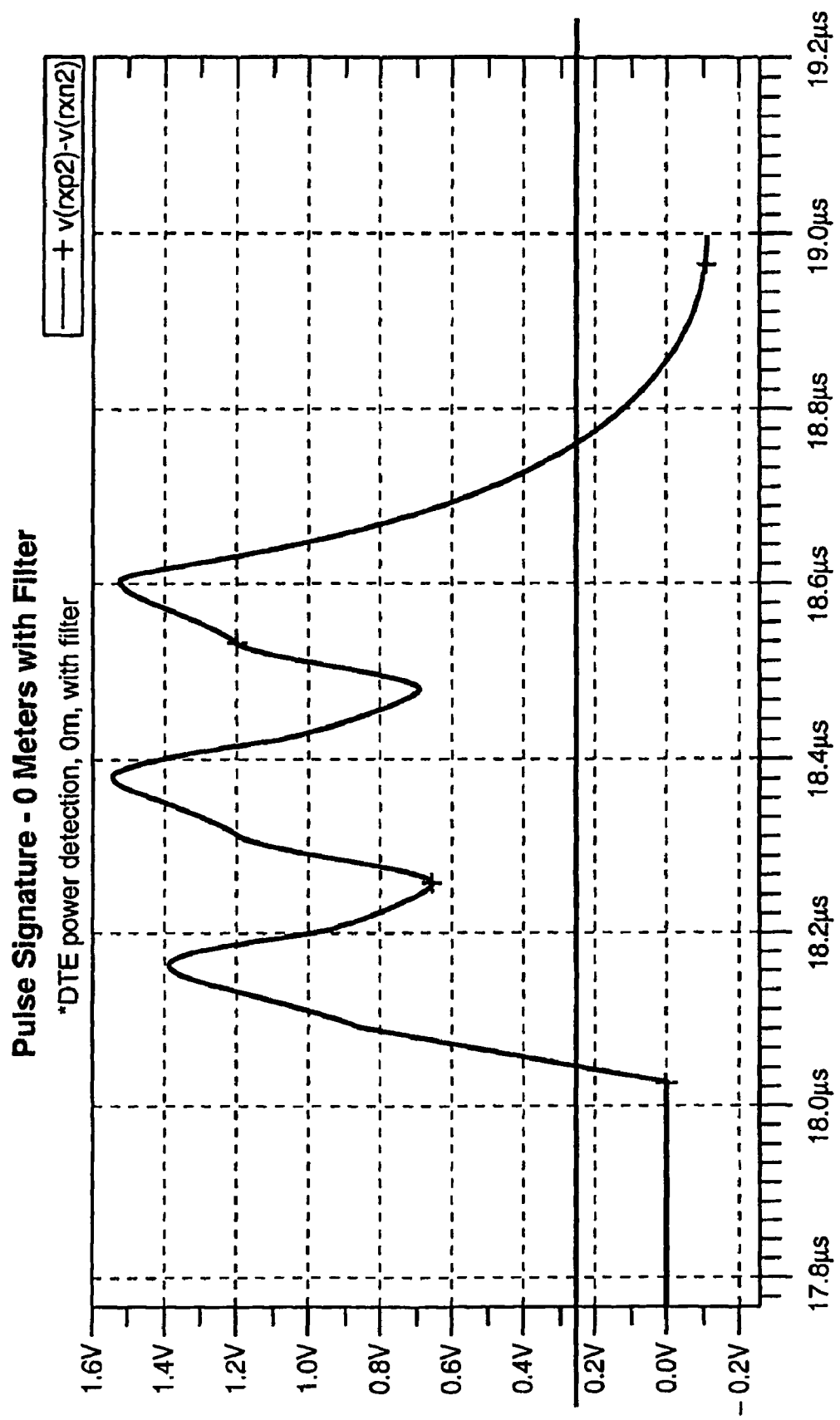
FIG._4B

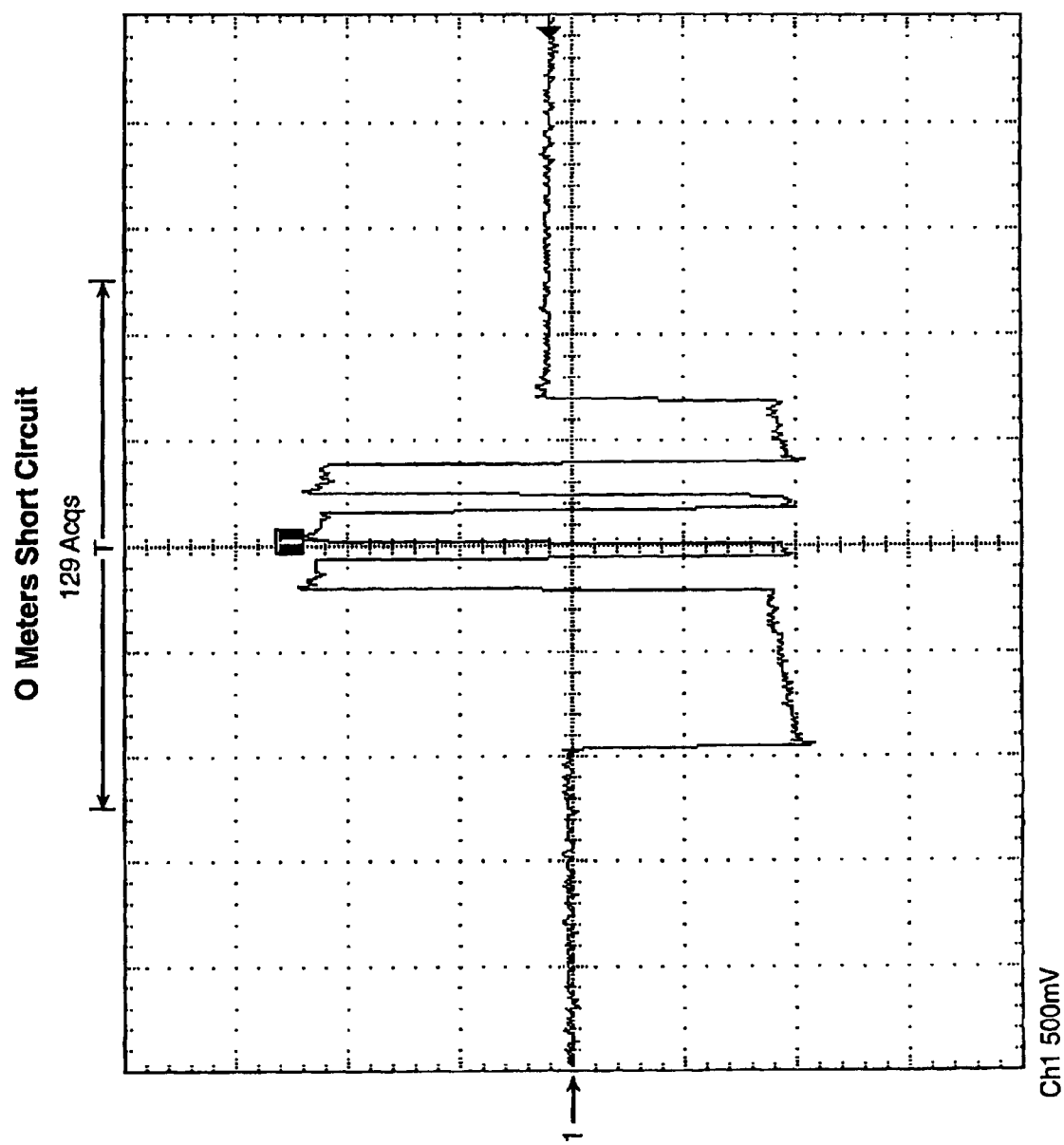
FIG._5A

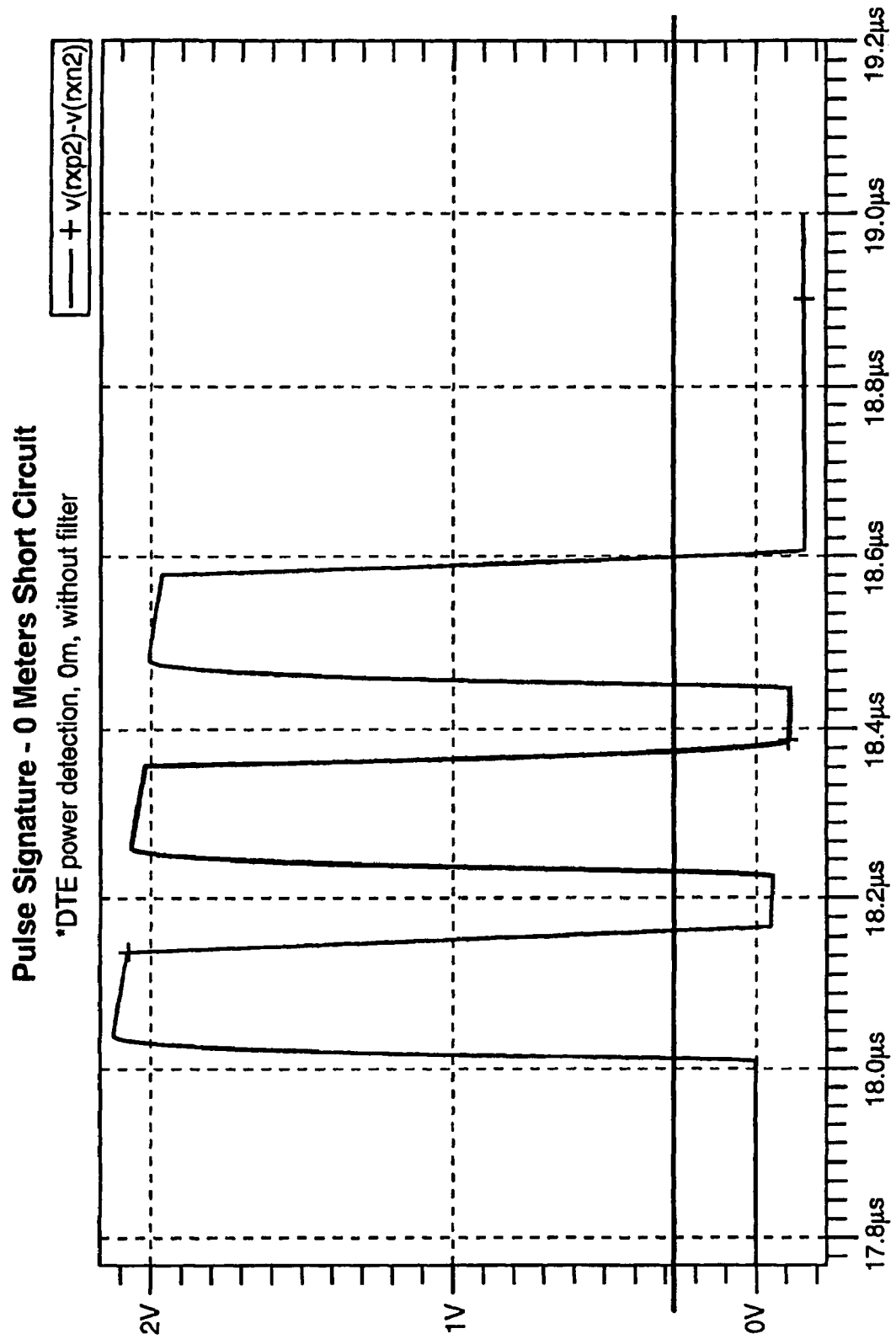
FIG._5B

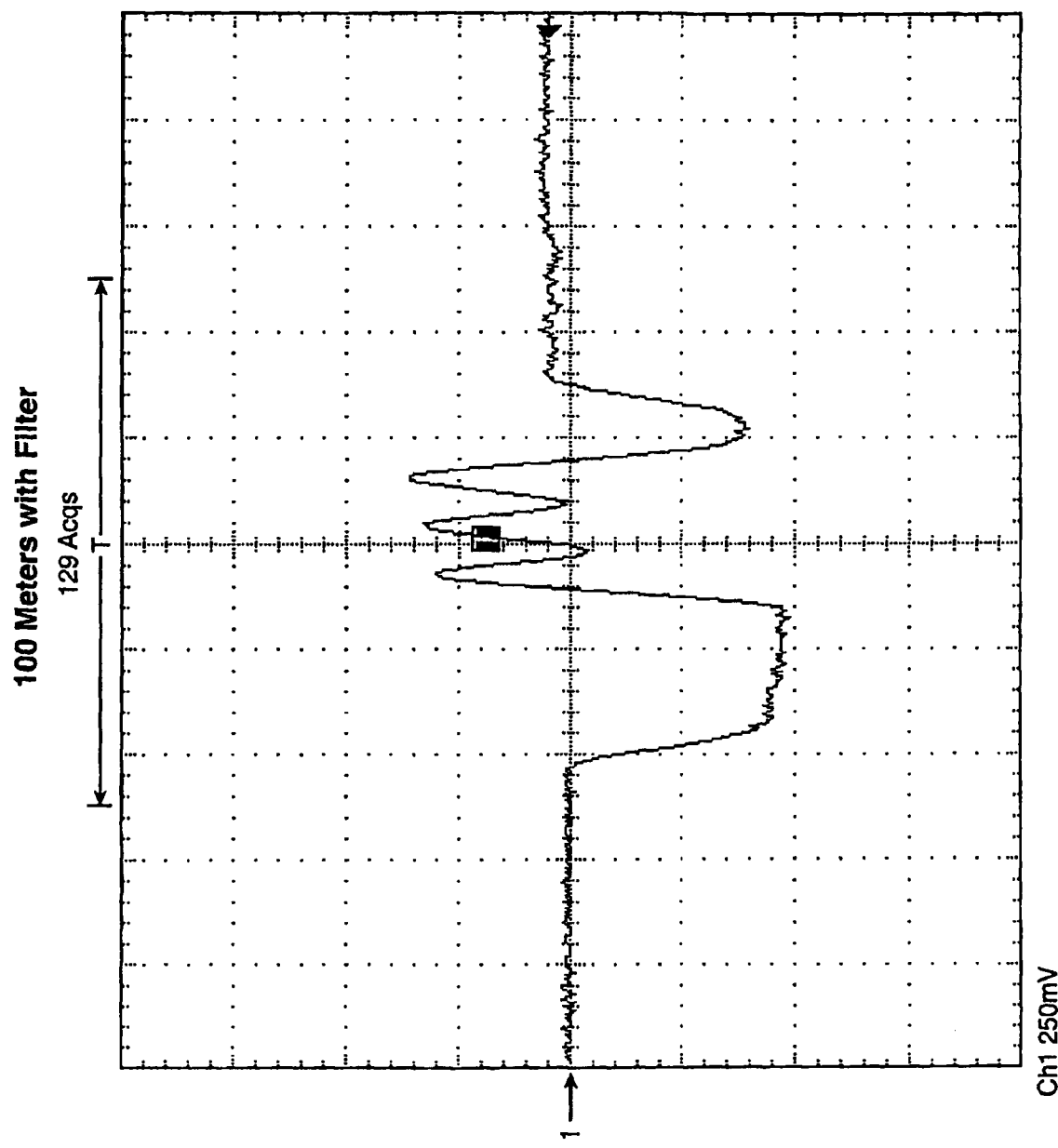

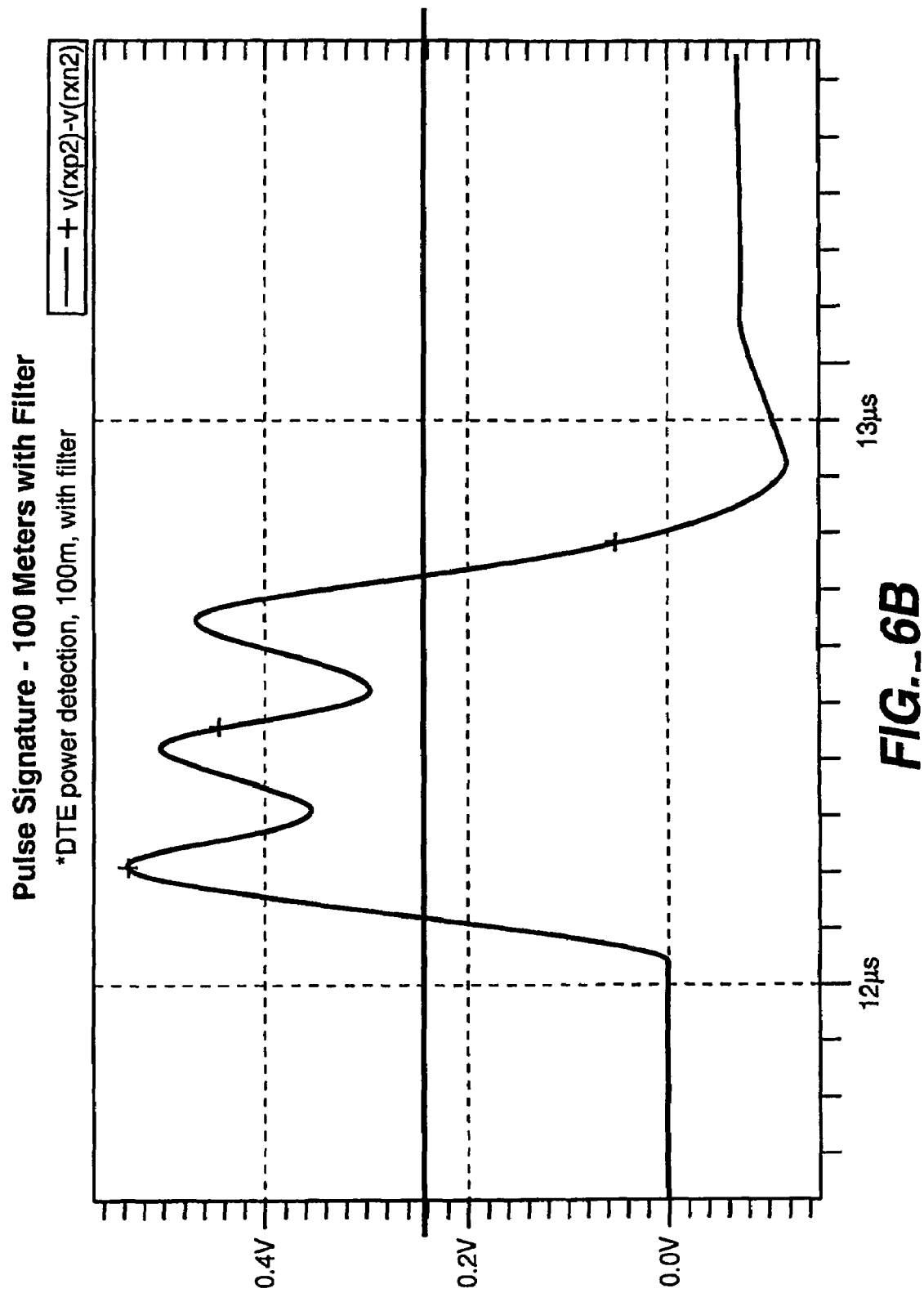
FIG._6B

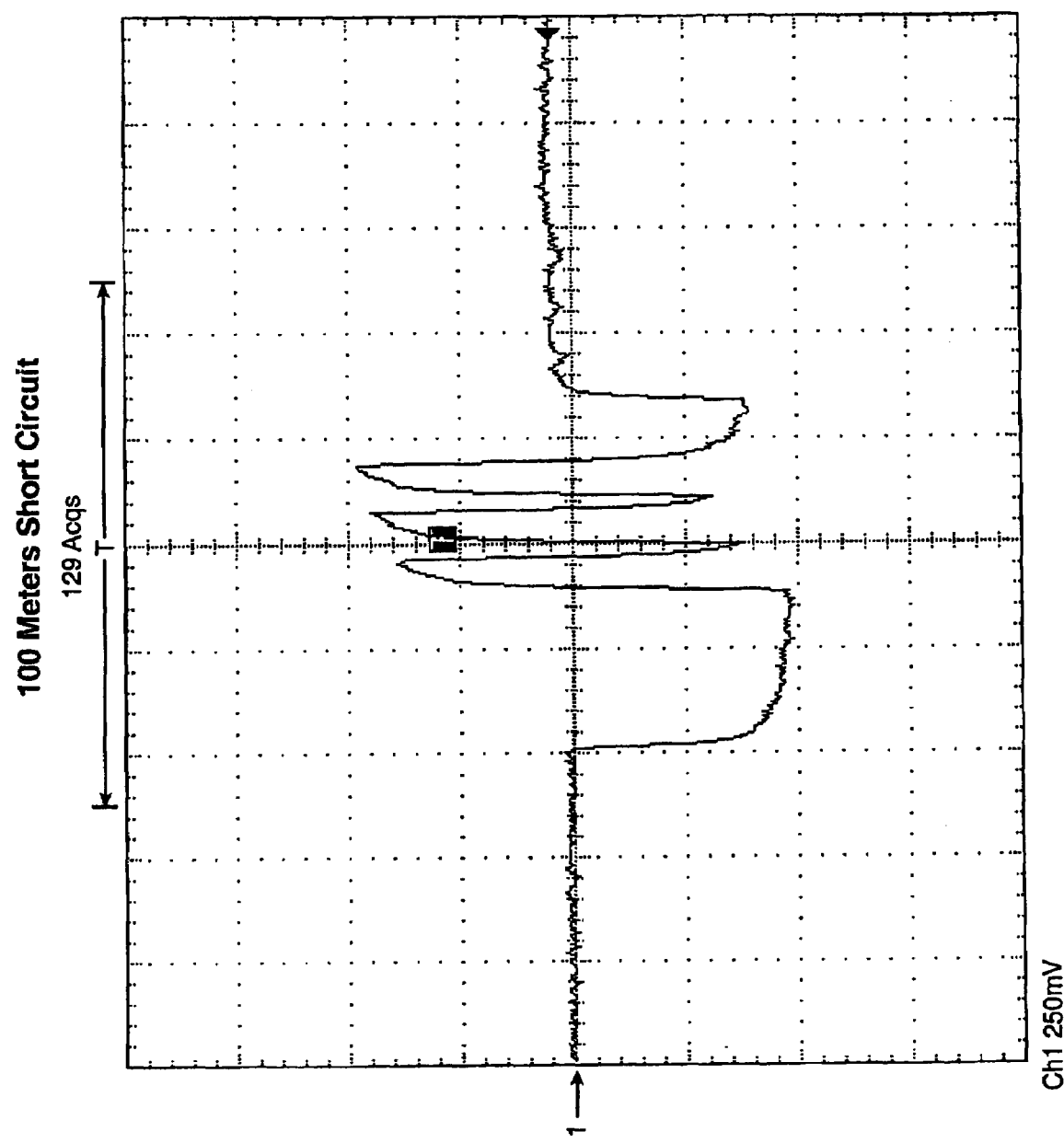
FIG._7A

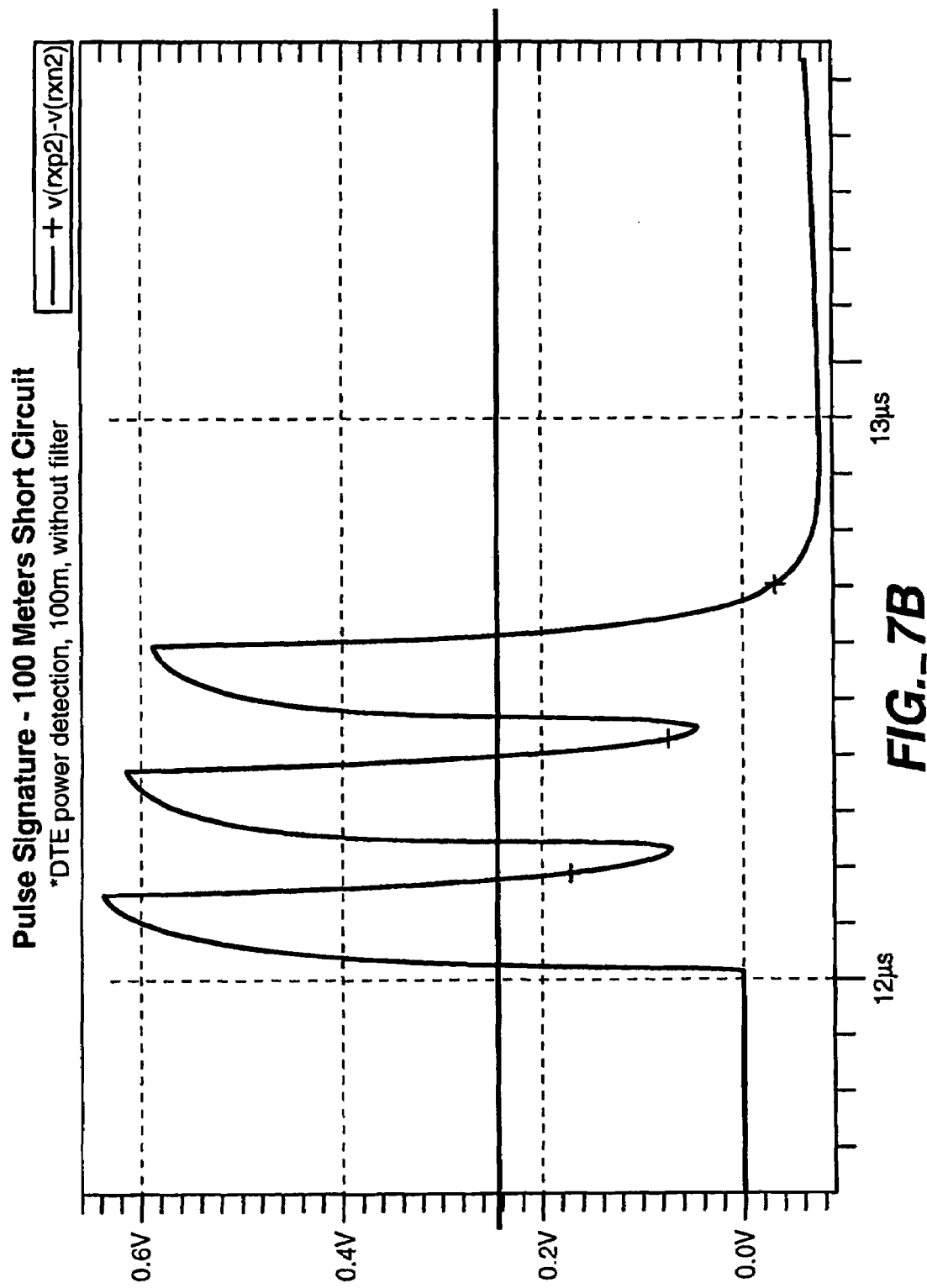

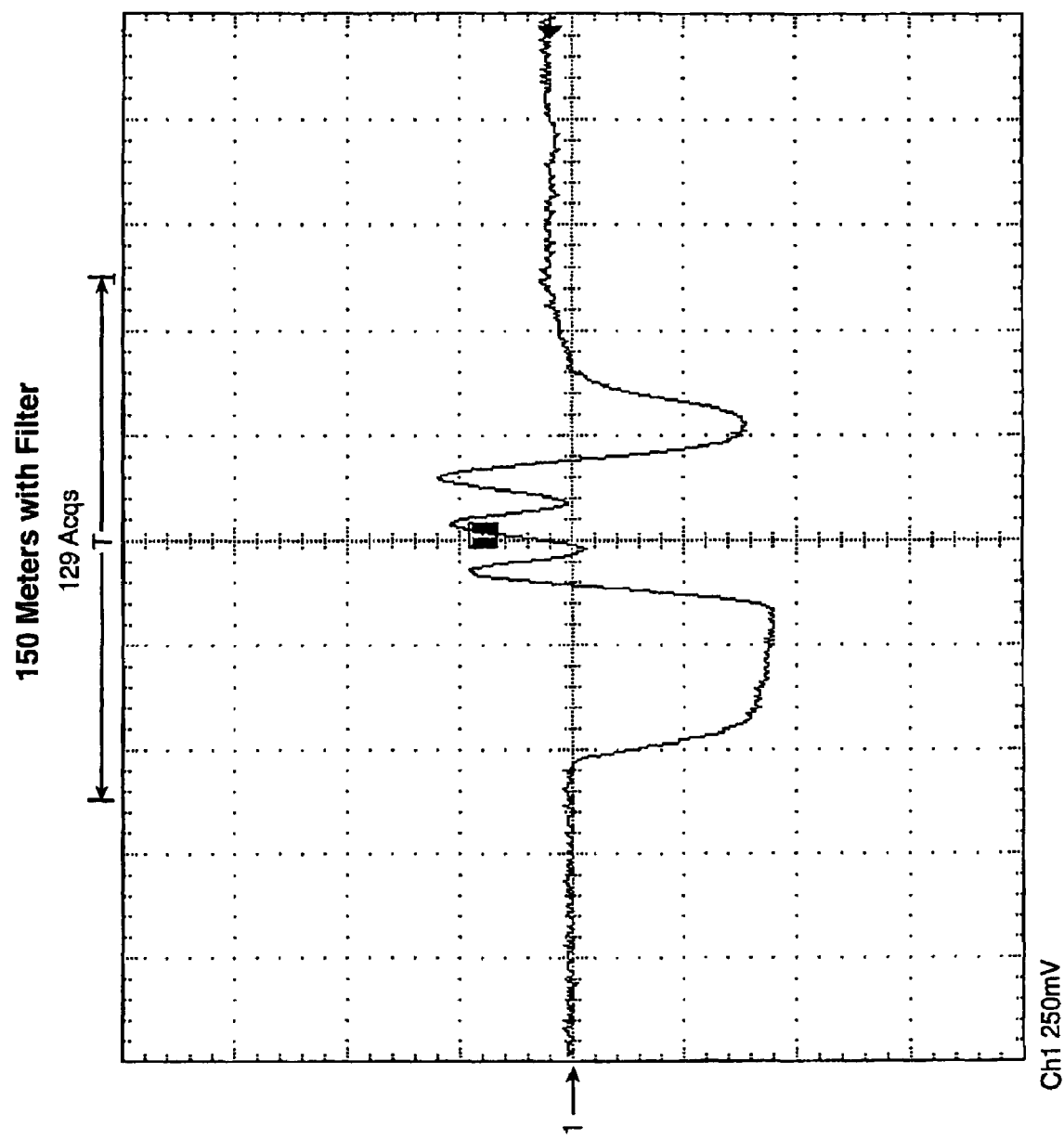
FIG._8A

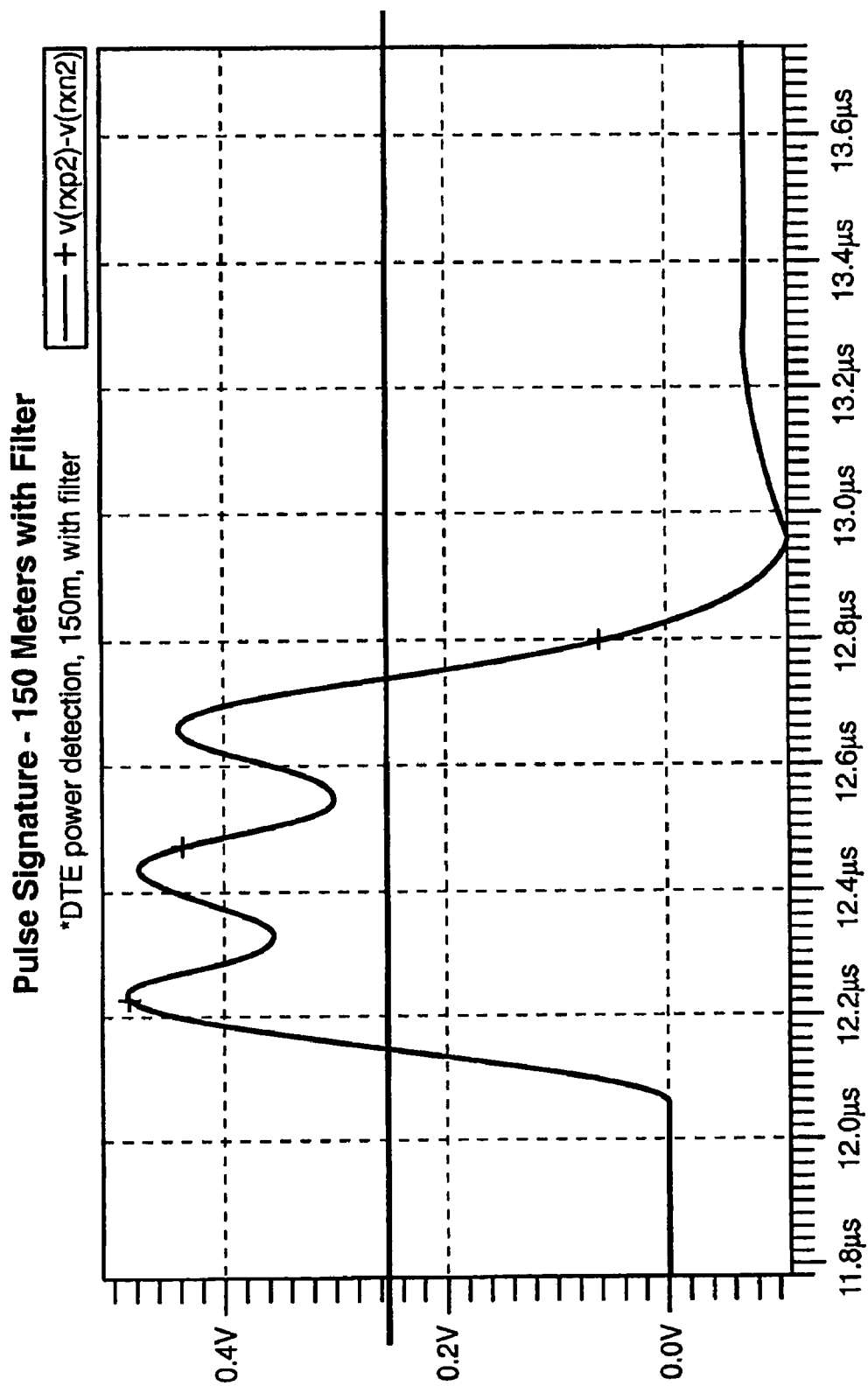

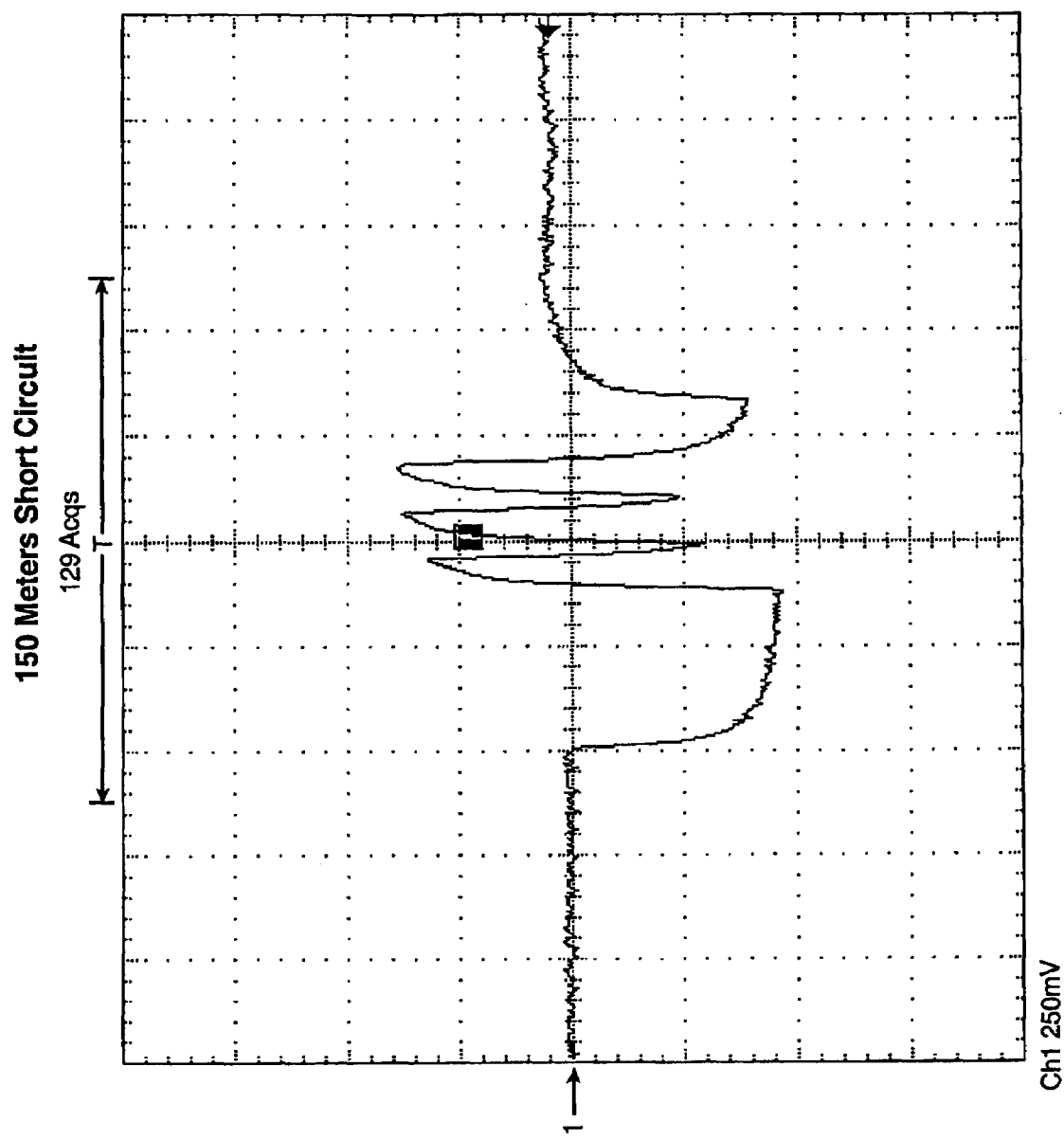
FIG._9A

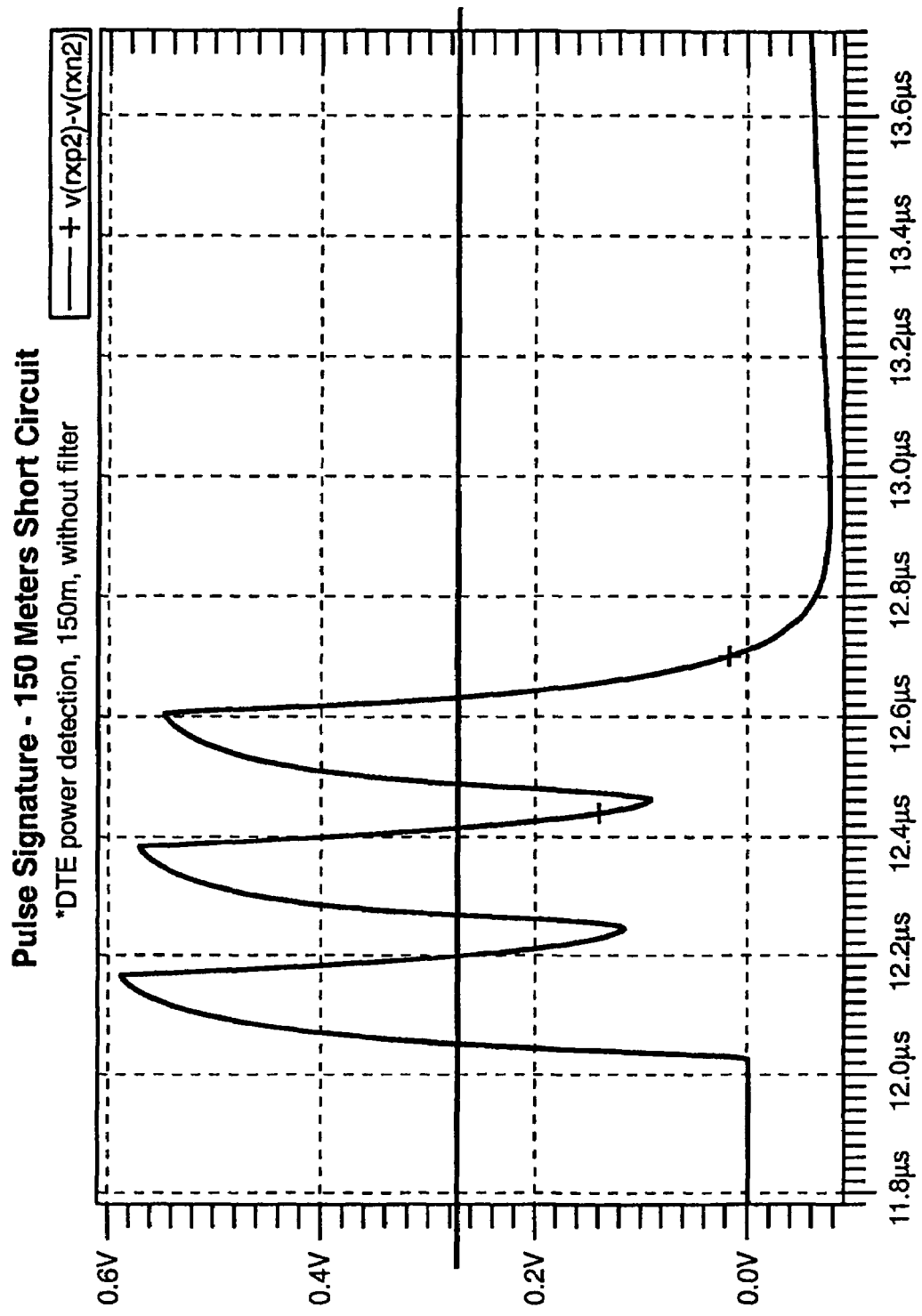
FIG._9B

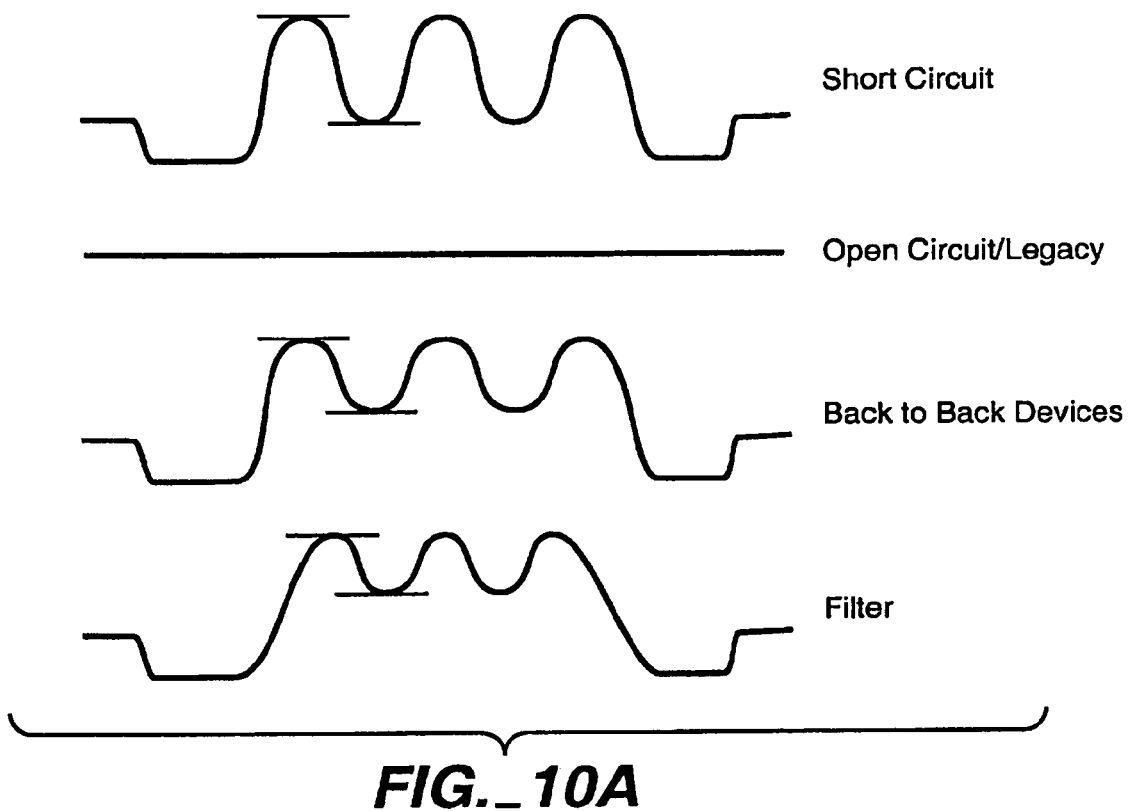
FIG._10A
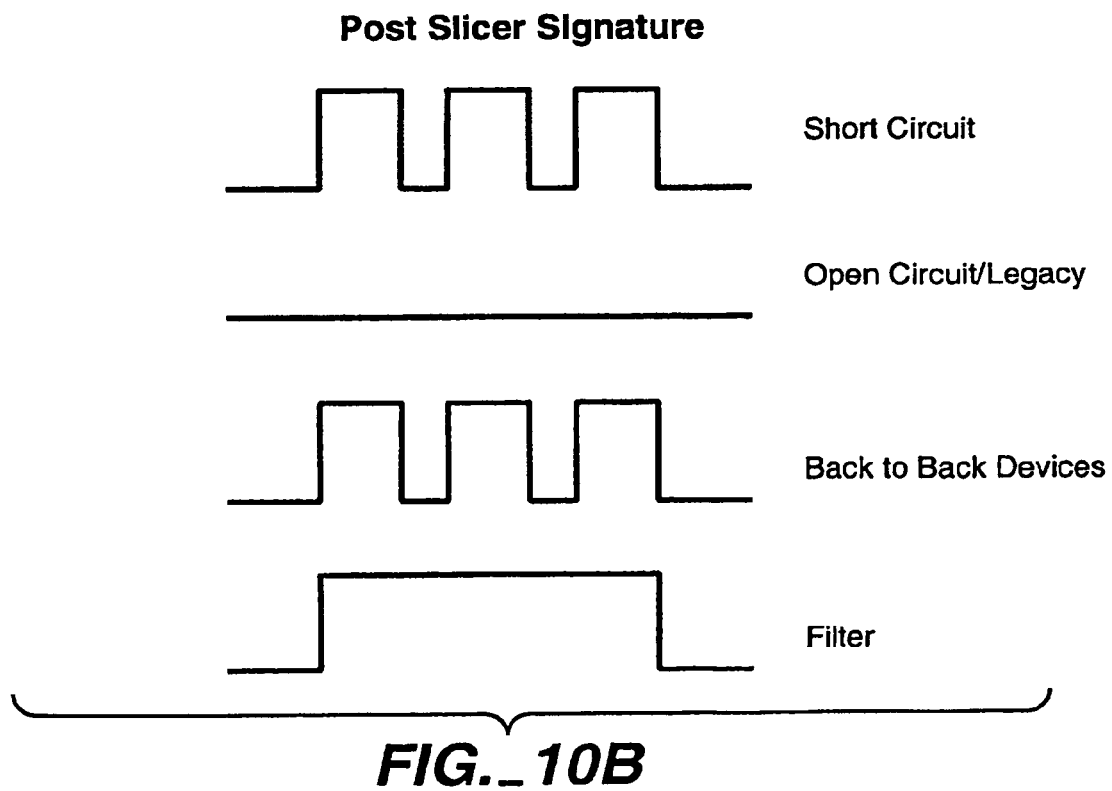
FIG._10B

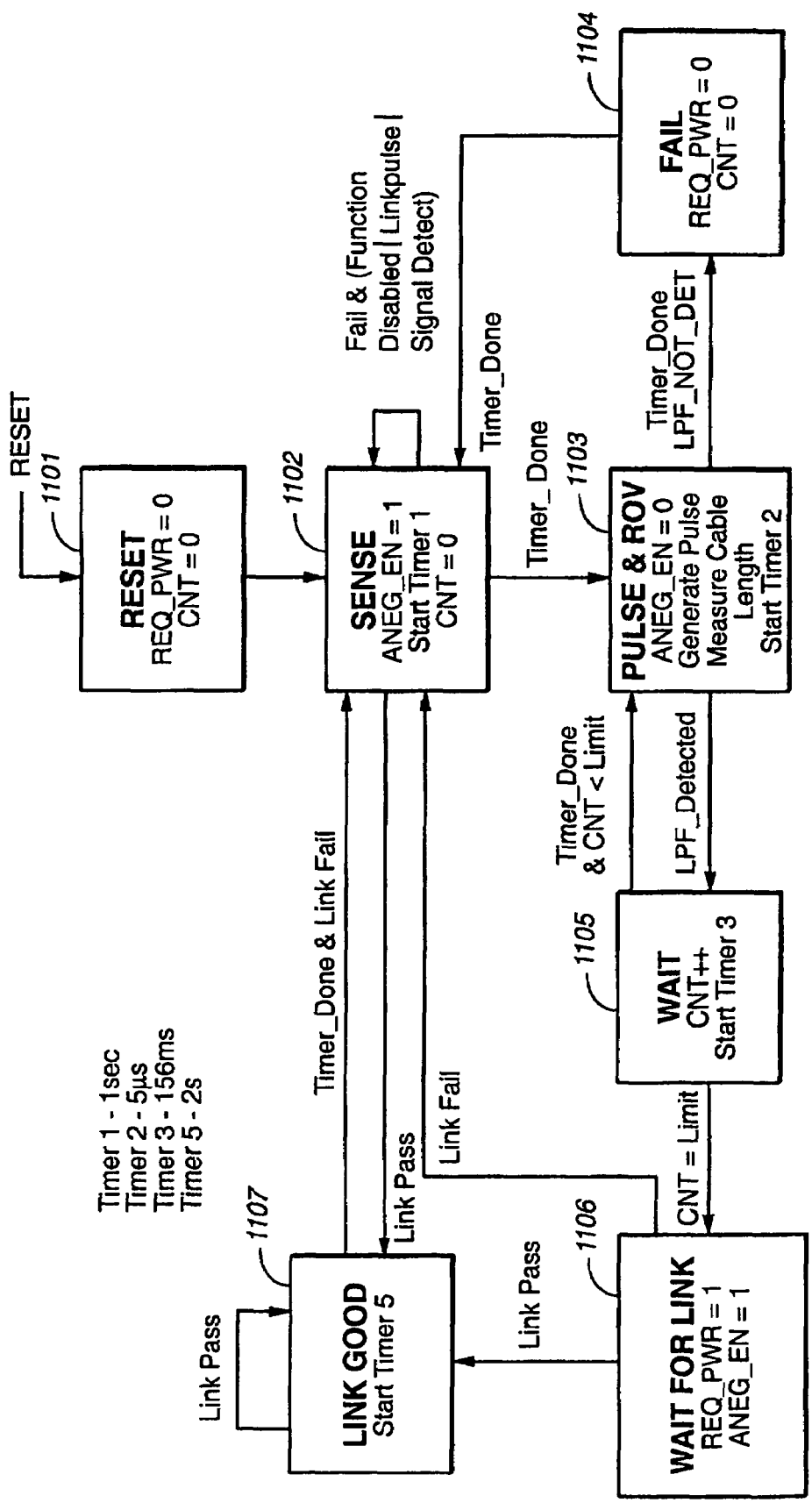

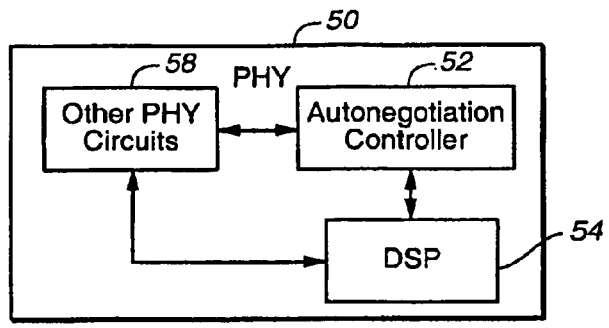
FIG._12
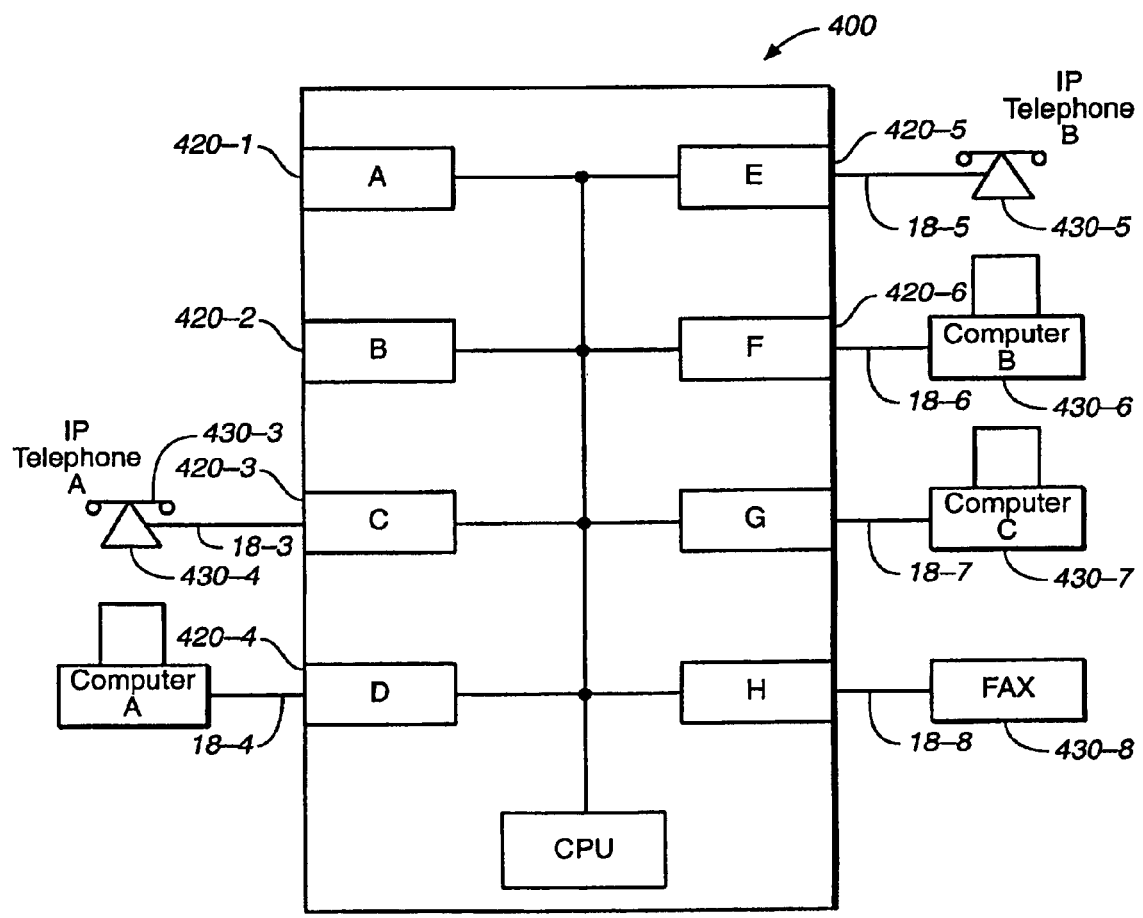
FIG._13

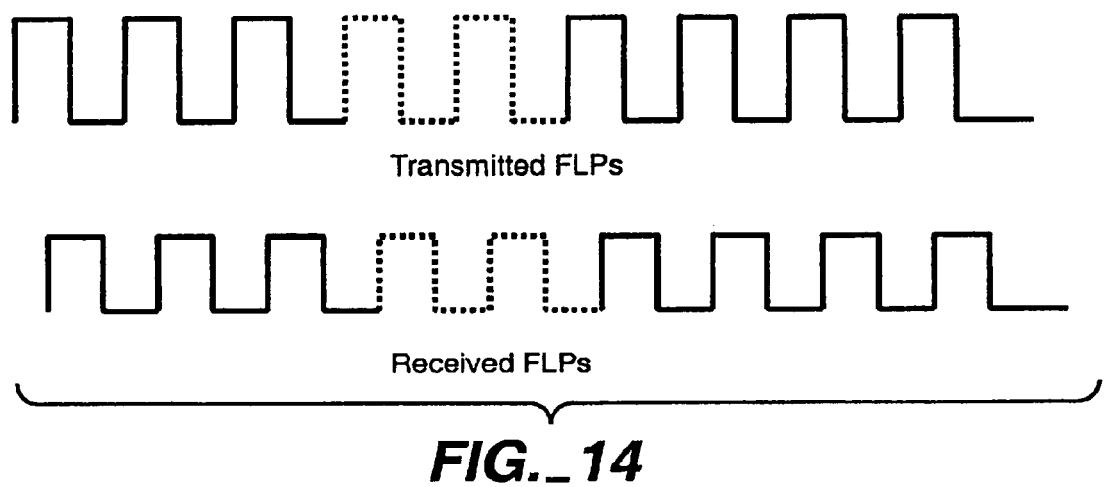
FIG._14
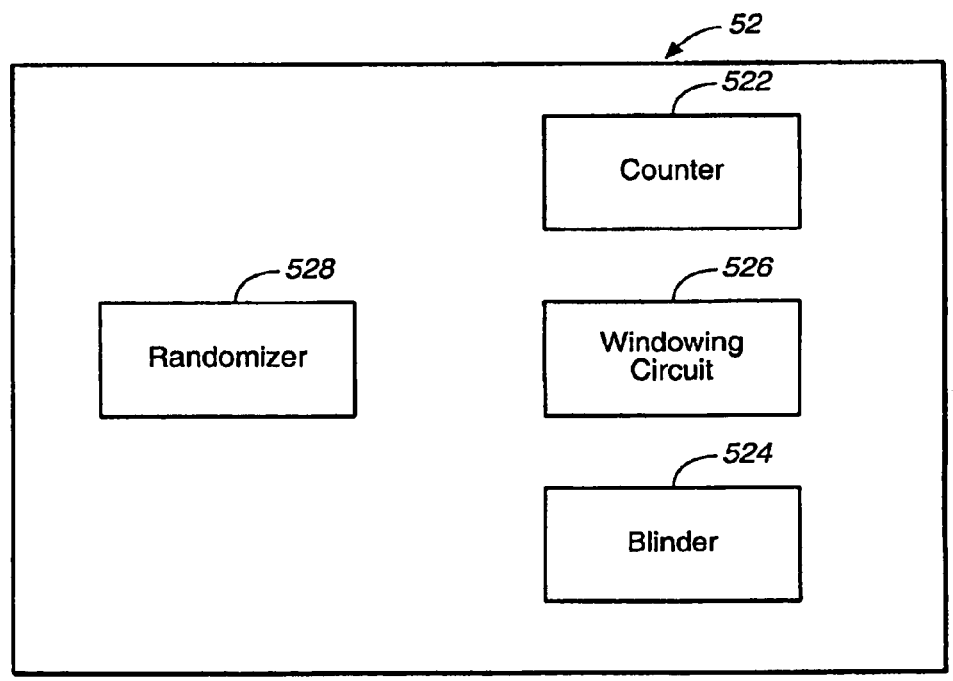
FIG._15

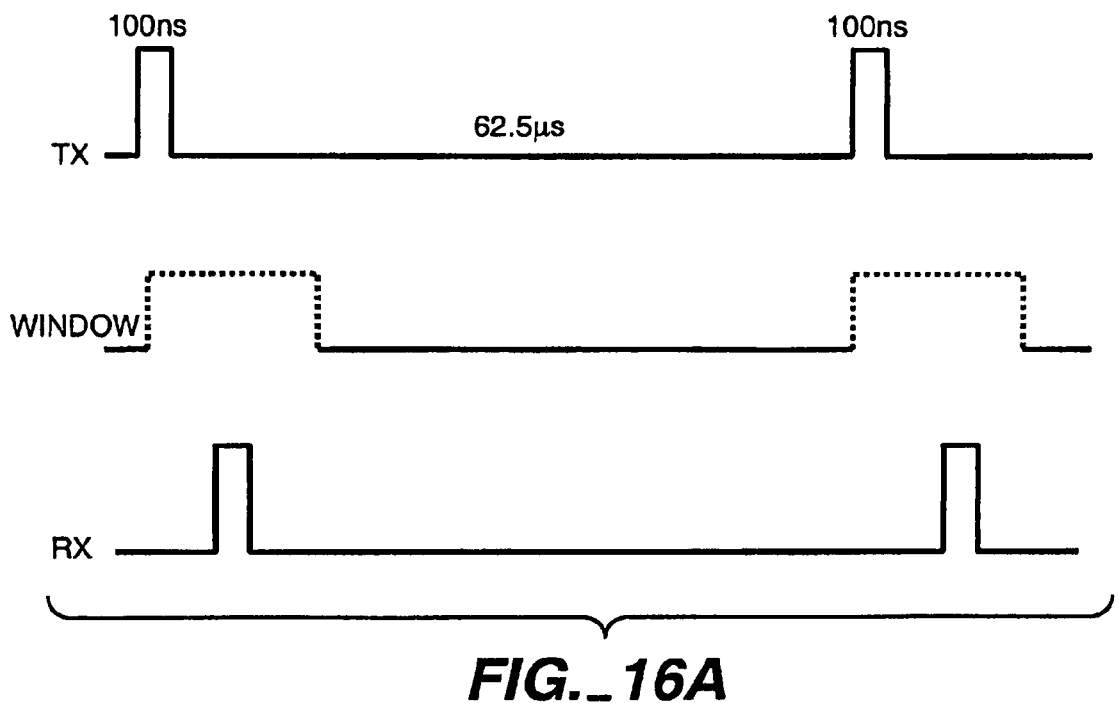
FIG._16A
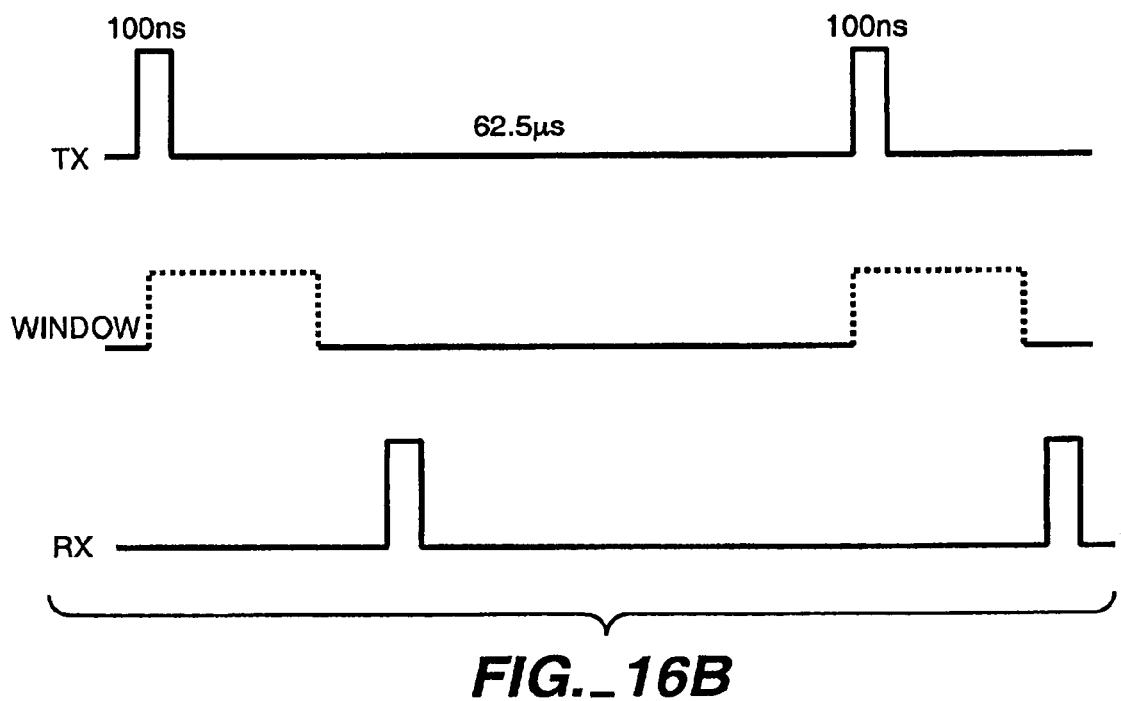
FIG._16B

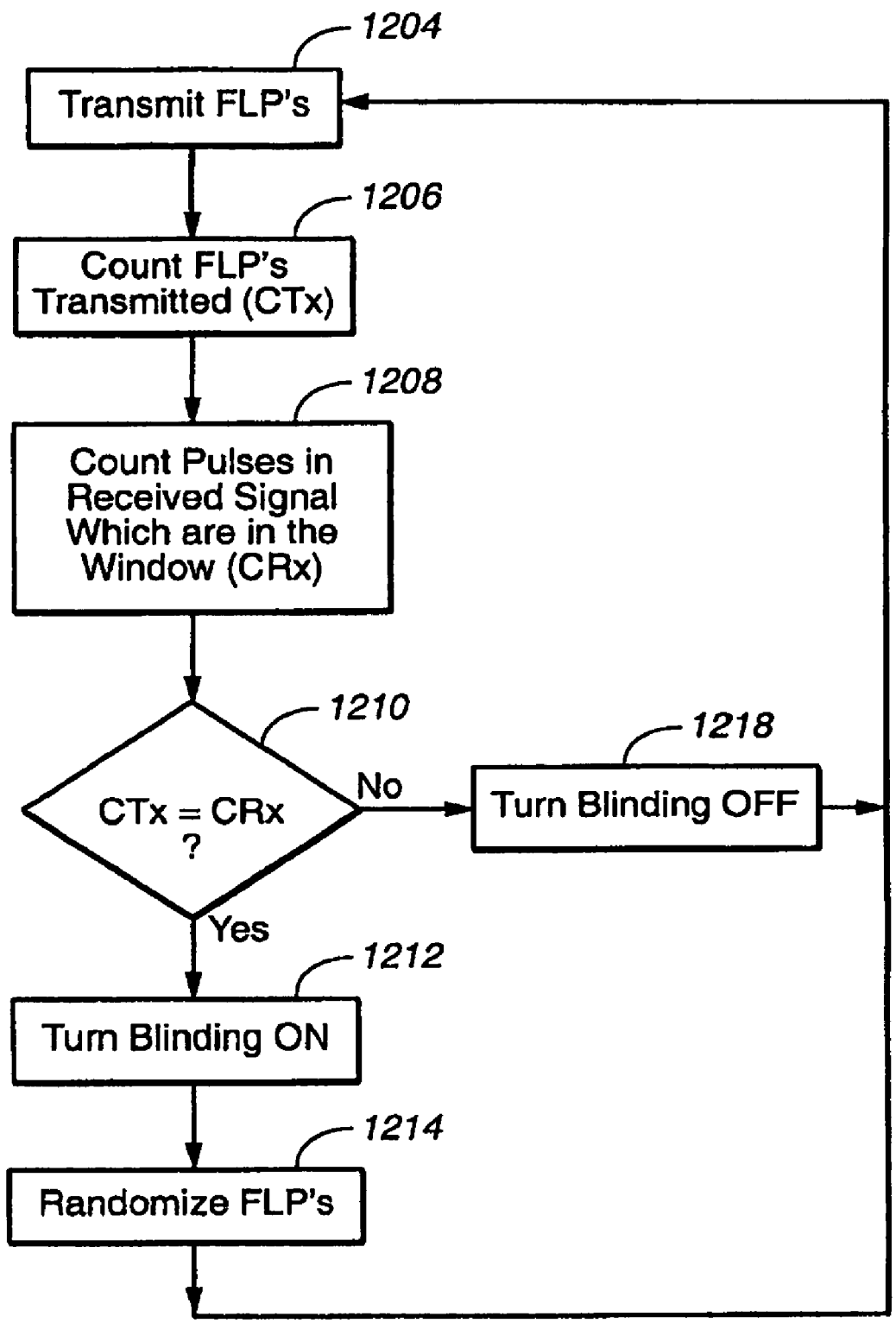
FIG._17

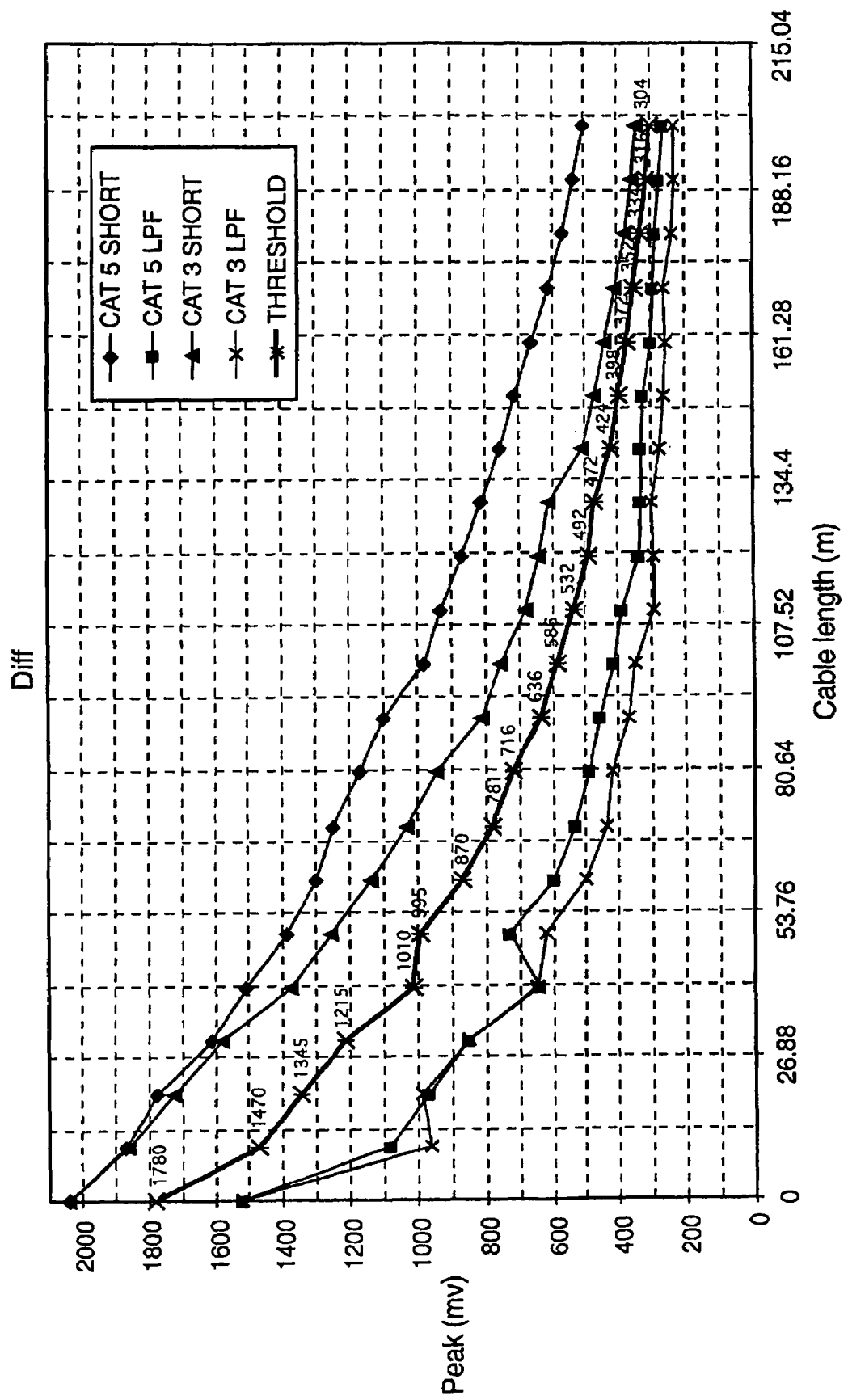
FIG._18

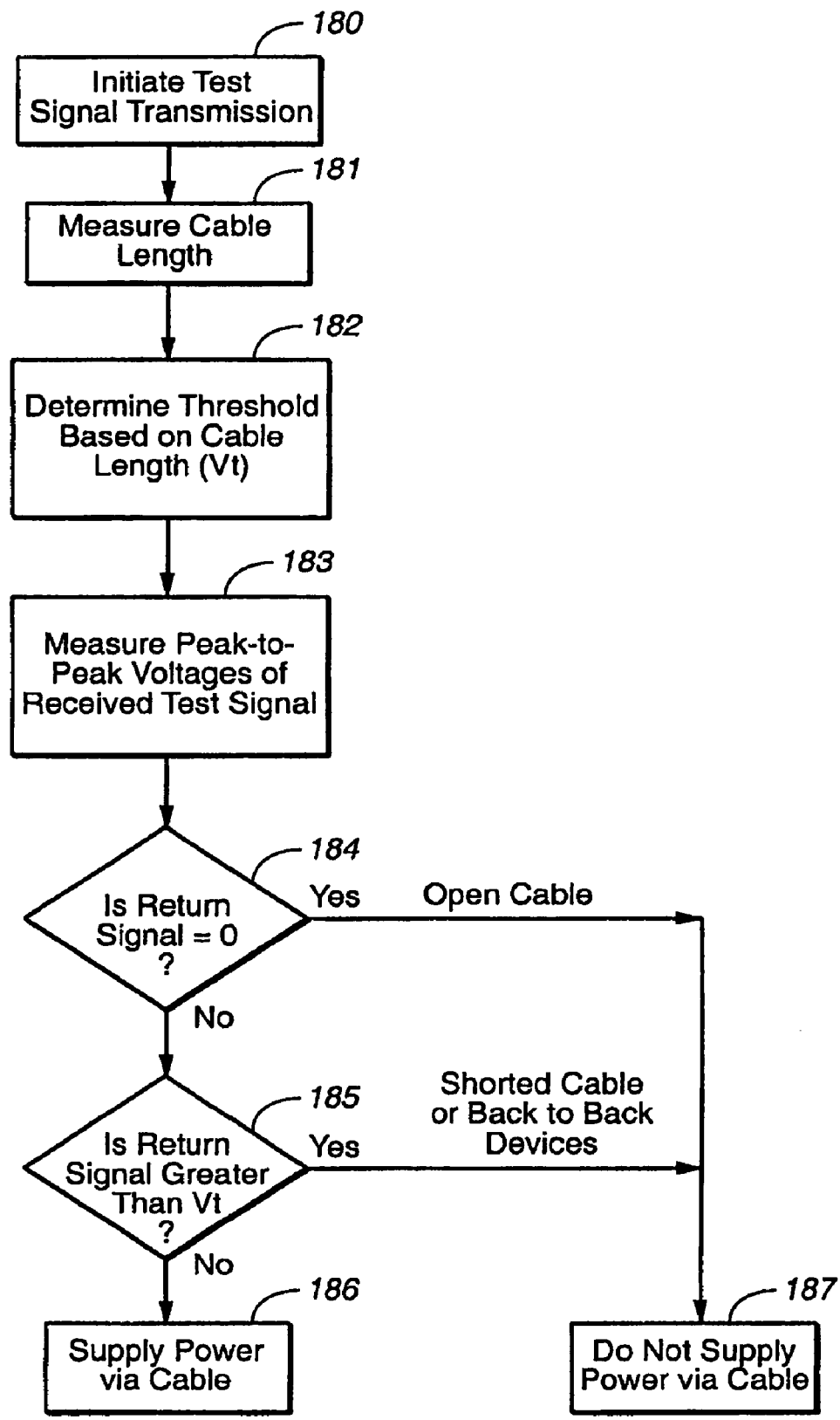
FIG._19

METHOD AND APPARATUS FOR AUTONEGOTIATION BETWEEN NETWORK DEVICES

CROSS REFERENCE TO RELATED APPLICATIONS

This application is a continuation of U.S. patent application Ser. No. 10/099,050, filed Mar. 15, 2002 (now U.S. Pat. No. 7,161,911, issued Jan. 9, 2007), which application claims priority under 35 U.S.C. 119(e) to U.S. provisional Application Ser. No. 60/280,735, entitled "Apparatus For DTE Power Via MDI and Method Thereof", filed Apr. 3, 2001, the contents of which are incorporated by reference herein.

BACKGROUND OF THE INVENTION

1. Field of the Invention

The present invention relates to autonegotiation controllers within the physical layer of devices that are connected to an Ethernet network. More particularly, the present invention is directed to an autonegotiation controller which detects returned pulse while having a good detection margins over a long cable and to detect a faulty filter connected thereto.

2. Description of the Related Art

FIG. 1 illustrates a network device 10 in communication with another network device 12 over cable 18. These devices are well known. Network devices include, by way of example, network switches, computers, servers, network enabled appliances and the like. Heretofore, network devices have generally required external power from an AC power source. This methodology suffers from a number of drawbacks, including requiring an external power supply, which can be costly. Accordingly, it would be desirable to implement a system in which the power for one network device 12 can be supplied from the other network device 10 via the data cable 18. This approach, however, would require a physical layer of network device 10 to determine whether a DTE device is connected to cable 18 and whether DTE device 12 requires power. The capability of supplying power over cable 18 is referred to as power on Ethernet cable or POE. In this application, the term "cable-powered DTE device" shall refer to a network device that requires power being supplied from another network device via a data cable, and the term "self-powered DTE device" shall refer to a network device in which power not supplied by the data cable. Self-powered DTE devices may be supplied by external power supplies or internal power supplies, such as, batteries.

In addition to detecting power, the physical layer of network device 10 also negotiates the highest common operating speed with network device 12. Referring again to FIG. 1, first and second devices 10 and 12 include physical layers 14-1 and 14-2 that are connected by a compliant cable 18 that includes four pairs of twisted pair wires (A, B, C and D). One type of compliant cable is referred to as Category 5. The physical layers 14-1 and 14-2 usually include digital signal processors (DSPs) and autonegotiation controllers (both not shown). The DSP of the first device receives and decodes signals from the second device. The DSP of the first device codes and transmits signals to the second device. The four pairs of twisted pair wires are typically labeled A (1, 2), B (3, 6), C (4, 5), and D (7, 8). In 10BASE-T and 100BASE-TX mode, only pairs A (1, 2) and B (3, 6) are required to autonegotiate, to establish a link, and to communicate. In 1000BASE-T mode, however, two pairs of twisted pair wires are required to autonegotiate and four pairs are required to establish a link and to communicate.

In 10BASE-T, 100BASE-TX, and 1000BASE-T modes, the physical layer performs autonegotiation before a link is established. During autonegotiation, the devices 10 and 12 negotiate the operating speed of the link as well as other functional capabilities of the devices. A device can advertise operating speeds that are less than or equal to the maximum operating speed of the device.

SUMMARY OF THE INVENTION

According to a first aspect of the present invention, a first network device in communications with a second network device comprising a physical layer device. The physical layer device comprises a transmitter to transmit an autonegotiation signal to the second network device, a receiver to receive a received signal from the second network device, and a controller comprising an autonegotiation controller to set a highest common data rate between the first network device and the second network device. When the autonegotiation signal is the same as the received signal the autonegotiation controller is disabled.

In accordance with a second aspect of the present invention, when the autonegotiation signal is different from the received signal the autonegotiation controller is enabled.

In accordance with a third aspect of the present invention, when the autonegotiation signal is the same as the received signal the timing of the autonegotiation signal is randomized.

In accordance with a fourth aspect of the present invention, the controller further comprises a counter to count a first number of pulses of the autonegotiation signal and a second number of pulses of the received signal, The autonegotiation signal is the same as the received signal when the first number of pulses equals the second number of pulses.

In accordance with a fifth aspect of the present invention, the controller further comprises a windowing circuit. The counter counts the second number of pulses of the received signal in a window determined by the windowing circuit, and the autonegotiation signal is the same as the received signal when the first number of pulses equals the second number of pulses.

In accordance with a sixth aspect of the present invention, the controller further comprises a detector to detect whether the second network device requires power to be supplied by the first network device. If the autonegotiation controller is disabled for more than a predetermined time then the detector is enabled.

In accordance with a seventh aspect of the present invention, a network comprises first network device and a second network device in communications therewith. The first network device comprises a physical layer device comprising a transmitter to transmit an autonegotiation signal to the second network device, a receiver to receive a received signal from the second network device, and a controller comprising an autonegotiation controller to set a highest common data rate between the first network device and the second network device. When the autonegotiation signal is the same as the received signal the autonegotiation controller is disabled In accordance with an eighth aspect of the present invention, first network device in communications with a second network device comprises physical layer means comprising. The physical layer means comprises transmitter means for transmitting an autonegotiation signal to the second network device, receiving means for receiving a received signal from the second network device, and controlling means comprising an autonegotiation controlling means for setting a highest common data rate between the first network device and the second network device. When the autonegotiation signal is the same as the received signal the autonegotiation controlling means is disabled.

In accordance with a ninth aspect of the present invention, when the autonegotiation signal is different from the received signal the autonegotiation controlling means is enabled.

In accordance with a tenth aspect of the present invention, when the autonegotiation signal is the same as the received signal the timing of the autonegotiation signal is randomized.

In accordance with an eleventh aspect of the present invention, the controlling means further comprises a counting means for counting a first number of pulses of the autonegotiation signal and a second number of pulses of the received signal. The autonegotiation signal is the same as the received signal when the first number of pulses equals the second number of pulses.

In accordance with a twelfth aspect of the present invention, the controlling means further comprises a windowing means. The counting means counts the second number of pulses of the received signal in a window determined by the windowing means, and the autonegotiation signal is the same as the received signal when the first number of pulses equals the second number of pulses.

In accordance with a thirteenth aspect of the present invention, the controlling means further comprises a detecting means for detecting whether the second network device requires power to be supplied by the first network device. If the autonegotiation controlling means is disabled for more than a predetermined time then the detecting means is enabled.

In accordance with a fourteenth aspect of the present invention, a method is provided for autonegotiating a highest common data rate between a first network device in communications with a second network device. The method comprises the steps of (a) transmitting an autonegotiation signal to the second network device, (b) receiving a received signal from the second network device, (c) autonegotiating the highest common data rate between a first network device and the second network device, (d) determining if the received signal is the same as the autonegotiation signal, and (e) blinding step (c) if as a result of step (d) the received signal is the same as the autonegotiation signal.

In accordance with a fifteenth aspect of the present invention, the method further comprises the step of (f) enabling step (c) if as a result of step (d) the received signal is different from the autonegotiation signal.

In accordance with a sixteenth aspect of the present invention, step (e) comprises the step of randomizing the autonegotiation signal.

In accordance with a seventeenth aspect of the present invention, step (d) comprises the step (d1) of counting a first number of pulses of the autonegotiation signal and a second number of pulses of the received signal, wherein the autonegotiation signal is the same as the received signal when the first number of pulses equals the second number of pulses.

In accordance with an eighteenth aspect of the present invention, step (d) comprises the step (d2) of windowing the received signal with respect to the autonegotiation signal wherein step (d1) counts the second number of pulses of the received signal in a window of step (d2), wherein the autonegotiation signal is the same as the received signal when the first number of pulses equals the second number of pulses.

In accordance with a nineteenth aspect of the present invention, the method further comprises the step of (g) detecting whether the second network device requires power to be supplied by the first network device. In step (e) if step (c) is disabled for more than a predetermined time then the detecting means is enabled.

In accordance with a twentieth aspect of the present invention, a computer program is provided for autonegotiating a highest common data rate between a first network device in communications with a second network device. The computer program comprises the steps of (a) transmitting an autonegotiation signal to the second network device, (b) receiving a received signal from the second network device, (c) autonegotiating the highest common data rate between a first network device and the second network device, (d) determining if the received signal is the same as the autonegotiation signal, and (e) blinding step (c) if as a result of step (d) the received signal is the same as the autonegotiation signal.

In accordance with a twenty-first aspect of the present invention, the computer program further comprises the step of (f) enabling step (c) if as a result of step (d) the received signal is different from the autonegotiation signal.

In accordance with a twenty-second aspect of the present invention, step (e) comprises the step of randomizing the autonegotiation signal.

In accordance with a twenty-third aspect of the present invention, step (d) comprises the step (d1) of counting a first number of pulses of the autonegotiation signal and a second number of pulses of the received signal, wherein the autonegotiation signal is the same as the received signal when the first number of pulses equals the second number of pulses.

In accordance with a twenty-third aspect of the present invention, step (d) comprises the step (d2) of windowing the received signal with respect to the autonegotiation signal wherein step (d1) counts the second number of pulses of the received signal in a window of step (d2), wherein the autonegotiation signal is the same as the received signal when the first number of pulses equals the second number of pulses.

In accordance with a twenty-fourth aspect of the present invention, the computer program further comprises the step of (g) detecting whether the second network device requires power to be supplied by the first network device. In step (e) if step (c) is disabled for more than a predetermined time then the detecting means is enabled.

BRIEF DESCRIPTION OF THE DRAWINGS

The present invention will become more fully understood from the detailed description and the accompanying drawings, wherein like reference symbols refer to like parts:

FIG. 1 illustrates two network devices that are connected together by a data cable with four pairs of twisted pair wires according to the prior art;

FIG. 2 illustrates a first network device connected to a second network by a data cable, the second network device requiring power via the data cable, in accordance with the present invention;

FIG. 2A illustrates a first network device connected to a second network by a data cable, the second network device not requiring power via the data cable;

FIG. 3A illustrates power detection signal generated by the signal generator of the first network device shown in FIGS. 2 and 2A, in accordance with a first embodiment of the present invention;

FIG. 3B illustrates power detection signal generated by the signal generator of the first network device shown in FIGS. 2 and 2A, in accordance with a second embodiment of the present invention;

FIG. 4A is a graph of the signal of FIG. 3A transmitted by a first network device to a cable-powered DTE device over a cable received by a detector of the first network device, the cable having a length of 0 meters, in accordance with the first embodiment of the present invention;

FIG. 4B is a graph of the signal of FIG. 3B transmitted by a first network device to a cable-powered DTE device over a cable received by a detector of the first network device, the cable having a length of 0 meters, in accordance with the second embodiment of the present invention;

FIG. 5A is a graph of the signal of FIG. 3A transmitted by a first network device to a cable-powered DTE device over a cable received by a detector of the first network device, the cable having a length of 0 meters in which the distal end of the cable is short circuited, in accordance with the first embodiment of the present invention;

FIG. 5B is a graph of the signal of FIG. 3B transmitted by a first network device to a cable-powered DTE device over a cable received by a detector of the first network device, the cable having a length of 0 meters in which the distal end of the cable is short circuited, in accordance with the second embodiment of the present invention;

FIG. 6A is a graph of the signal of FIG. 3A transmitted by a first network device to a cable-powered DTE device over a cable received by a detector of the first network device, the cable having a length of 100 meters, in accordance with the first embodiment of the present invention;

FIG. 6B is a graph of the signal of FIG. 3B transmitted by a first network device to a cable-powered DTE device over a cable received by a detector of the first network device, the cable having a length of 100 meters, in accordance with the second embodiment of the present invention;

FIG. 7A is a graph of the signal of FIG. 3A transmitted by a first network device to a cable-powered DTE device over a cable received by a detector of the first network device, the cable having a length of 100 meters in which the distal end of the cable is short circuited, in accordance with the first embodiment of the present invention;

FIG. 7B is a graph of the signal of FIG. 3B transmitted by a first network device to a cable-powered DTE device over a cable received by a detector of the first network device, the cable having a length of 100 meters in which the distal end of the cable is short circuited, in accordance with the second embodiment of the present invention;

FIG. 8A is a graph of the signal of FIG. 3A transmitted by a first network device to a cable-powered DTE device over a cable received by a detector of the first network device, the cable having a length of 150 meters, in accordance with the first embodiment of the present invention;

FIG. 8B is a graph of the signal of FIG. 3B transmitted by a first network device to a cable-powered DTE device over a cable received by a detector of the first network device, the cable having a length of 150 meters, in accordance with the second embodiment of the present invention;

FIG. 9A is a graph of the signal of FIG. 3A transmitted by a first network device to a cable-powered DTE device over a cable received by a detector of the first network device, the cable having a length of 150 meters in which the distal end of the cable is short circuited, in accordance with the first embodiment of the present invention;

FIG. 9B is a graph of the signal of FIG. 3B transmitted by a first network device to a cable-powered DTE device over a cable received by a detector of the first network device, the cable having a length of 150 meters in which the distal end of the cable is short circuited, in accordance with the second embodiment of the present invention;

FIG. 10A illustrates the pulse signatures of the received detection signal, in accordance with the present invention, in accordance with the first embodiment of the present invention;

FIG. 10B illustrates the pulse signatures of the received detection signal, in accordance with the present invention, in accordance with the second embodiment of the present invention;

FIG. 11 is a state diagram of the detection algorithm, in accordance with the present invention;

FIG. 12 is a functional block diagram of a device with a physical layer that includes an autonegotiation controller according to the present invention;

FIG. 13 is a schematic diagram of a switch in accordance with the present invention;

FIG. 14 show illustrates the pulses received from a cable-powered DTE device having a faulty or leaky filter;

FIG. 15 is a block diagram of the autonegotiation controller in accordance with the present invention;

FIG. 16A show illustrates the pulses received within a window from a cable-powered DTE device having a leaky filter;

FIG. 16B show illustrates the pulses received outside a window from a second network device;

FIG. 17 is a flow chart of the autonegotiation controller of the first network device, in accordance with the present invention; and FIG. 18 is a graph of the differences between the maximum pulse vs. the cable length in accordance with the first embodiment of the present invention.

FIG. 19 is a flow chart utilized implemented by a detector to detect whether a second device is a cable-powered device.

DETAILED DESCRIPTION OF THE INVENTION

The following description of the preferred embodiments is merely exemplary in nature and is in no way intended to limit the invention, its application, or uses.

Power Detection

The first embodiment of the present invention is directed to a physical layer of a network device which can determine if the network device it is communicating with requires power to be supplied by via the data cable therebetween. Examples of network devices requiring power via the data cable include IP telephones, fax machines, other Internet appliances and the like.

Reference is now made to FIG. 2. As shown therein a first network device 10 is connected to a second network device 12 via a transmission line 18 or data cable. In this example, first network device 10 detects and provides power to second network device 12 via data cable 18. FIG. 2A illustrates an example in which second network device 12' is supplied with power from an external source, and does not need to be supplied with power from first network device 10 via data cable 18. It is noted that only the A and B pairs of cable 18 are shown for purposes of simplicity. Additionally, the first and second network devices are shown as either a 10BASE-T or 100BASE-TX device. During the autonegotiation phase and power detection phase, a network device that is 1000BASE-TX compliant is operated as a 10BASE-T device, and can be schematically represented as shown in FIG. 2. In this application, the term "cable-powered DTE device" shall refer to a network device that requires power being supplied from another network device via a data cable, and the term "self-powered DTE device" shall refer to a network device in which power not supplied by the data cable. Self-powered DTE devices may be supplied by external power supplies or internal power supplies, such as, batteries.

The following discussion will focus on the detection of a cable-powered DTE by first network device 10. Referring the specifically to FIG. 2, first network device 10 comprises, inter alia, a transmitter 312, a first transformer 316, a receiver 314, a second transformer 318, a power supply 320, a signal generator 322, a detector 324 and controller 326. The output of transmitter 312 is coupled to the secondary side of transformer 316, and the primary side of transformer is connected to pair A of data cable 18. Pair B of data cable B is connected to the primary side of transformer 318, and the secondary side of transformer 318 is connected to receiver 314. The primary sides of transformer 316 and 318 comprise center taps, which are connected to power supply 320 to supply power over data cable 18 to cable-powered DTE device 12. The output of signal generator 322 is connected to the input of transmitter 312, and the output of receiver 314 is connected to the input of detector 324. Controller 326 controls the operation of signal generator 322 and power supply 320, and controller 326 is responsive to the output of detector 324. Transmitter 312 and receiver 314 each operates in a conventional manner, and no further discussion will be presented herein.

In response to controller 326, signal generator 322 generates test signals to be transmitted by transmitter 312 to the second network device 12 over pair A of data cable 18. Receiver 314 may receive a signal on pair B of data cable 18 and outputs it to detector 324, as described in detail hereinbelow. If detector 324 detects that the second network device is a cable-powered DTE device, controller energizes power supply 320, which provides power to the cable-powered DTE device via data cable 18. If, however, detector 324 does not detect a cable-powered DTE device, power supply remains disabled.

FIG. 2 shows and example of a cable-powered DTE device 12. As shown in that figure, pair A of cable 18 is connected to the primary of transformer 334. The secondary of transformer 334 is connected to selector 333, which selects either receiver 342 or filter 352. Pair B of cable 18 is connected to the primary of transformer 330, and the secondary of transformer 333 is connected to selector 333, which selects either transmitter 344 or filter 352. Load 350 and controller 352 are connected across the center taps of the primaries of transformers 334 and 330. Load 350 comprises for example the load of the receiver 342, transmitter 344 and other circuits constituting the cable-powered DTE device. Controller 352 controls selector 333. In the deenergized state or when power is not supplied over data cable 18, selector 333 connects the secondaries of transformer 334 and 333 to filter 352. Typically filter 352 is a low-pass filter. Controller 352 detects when network device supplies 10 power to cable 18. Since load 350 is in parallel to controller 352, power is also supplied to load 350 at the same time as power is supplied to controller 352. When power is supplied to controller 352, selector 333 is controlled to connect the secondary of transformer 334 to receiver 342 and the secondary of transformer 330 to transmitter 334. At substantially the same time, power is supplied to receiver 342, transmitter 344 and the other circuits of cable-powered DTE device 12. At this point cable-powered DTE device 12 can begin the autonegotiating with network device 10.

FIG. 2A is an example of network device 10 in communication with self-powered DTE device 12'. As shown in that figure, pair A of cable 18 is connected to the primary of transformer 334. The secondary of transformer 334 is connected to receiver 342. Pair B of cable 18 is connected to the primary of transformer 330, and the secondary of transformer 333 is connected to transmitter 344. Since self-powered DTE device 12' is powered externally, self-powered DTE device 12' can begin autonegotiation with network device 10.

A more detailed description of signal generator 322 and detector 324 is presented herein below.

Referring again to FIG. 2, the cutoff frequency of the low-pass filter 352 is set to filter out the 100-ns fast link pulses (FLPs). As described hereinbelow, the FLPs are utilized by network devices in the autonegotiation process. Thus, in this embodiment, first network device 10 transmits test signals having pulse widths greater than 100 ns, which will pass through low-pass filter 352.

Referring to FIG. 11, a state diagram of the detection algorithm. The RESET state 1101 is the starting point for the algorithm. The algorithm may be activated, for example, by reception of a Reset signal, as indicated by the input arrow to the RESET block. A variable labeled REQ_PWR is set to zero to indicate that the default state is that power is not required. A counter variable, labeled CNT, is initialized to zero. In the SENSE state 1102, a variable labeled ANEG_EN is set to one to indicate that network device 10 is enabled to autonegotiate the highest common transmission speed with network device 12 (link partner). If the autonegotiation function is disabled ANEG_EN is set to zero), it will stay in the SENSE state 1102 until link is established, otherwise, Timer 1 is set to time out after 1 second. Timer 1 can be reset by detecting an incoming link pulse or other signal activities. Signal generator 322 will either generate continuous streams of data or a link pulse nominally once per 16 ms (10BASE-T or Auto-Negotiation enabled). If network device 12 is a self-powered DTE device then network device 10 and network device 12 will attempt to autonegotiate. If network device 12 is a cable-powered DTE device, no activity will be seen during the 1 second interval, and Timer 1 will time out, and the algorithm will proceed to PULSE&RCV state 1103.

In PULSE&RCV state 1103, the test signal (as shown in FIGS. 3A and 3B) is generated by signal generator 322, and ANEG_EN is set to zero (i.e., Auto-Negotiation mode is disabled) to indicate that the circuit is in a test state rather than a normal operational state. Signal 312 generates the detection signal. The second timer, Timer 2, is set to 5 μs. The purpose of Timer 2 is to time out if no return signal is detected, which means the cable is open. Under this condition, theit will enter the FAIL state 1104. If the returned signal is detected in 5 μs, by comparing the difference of the transmitted signal and the returned signal, the cable length can be calculated and a peak-to-peak amplitude threshold can be determined as a function of the cable length. A lookup table can preferably be implemented to accomplish this function. By comparing this threshold with the peak-to-peak amplitude of the returned pulse, the present invention can determine if there is a filter at the far end or the far end is shorted.

If the far end is shorted, the FAIL state 1104 is entered. If a filter is detected the WAIT state 1105 is entered. In this state, the counter CNT is incremented; in the first instance, CNT is set equal to one. The third timer, Timer 3, is set to 156 ms. The purpose of Timer 3 is to wait until the next test signal is to be generated. Referring again to FIGS. 3A and 3B, the pulses are spaced by at least 156 ms. therefore another pulse can be expected before 130 ms. expires. The 130-ms interval prevents false 10BASE-T detection by second network device 12, because 125 ms of inactivity ensures that network device 12 will reset. If Timer 3 expires and the counter has not reached the Limit value, then PULSE&RCV state 1102 is reentered, and the process is repeated. This process is repeated several times to ensure that an anomalous determination that power is required does not occur. A typical Limit value may be 3.

Once the counter reaches the Limit value, the process proceeds to the WAIT FOR LINK state 1106. In this state, detector 324 has determined that second network device 12 is a cable-powered DTE device, so REQ_PWR is set to one. The counter CNT is reset to zero, ANEG_EN is set to one, and then the SENSE state 1102 is entered. The present invention waits for the link partner to be powered up and to establish a link. If a successful link is established, then the process proceeds to the LINK GOOD state 1107. In this state, the counter CNT is again reset to zero, and the fifth timer, Timer 5, is set to 2 seconds. Once Timer 5 expires, the link is tested again. If the link is still good, Link Pass is indicated, and the algorithm stays in the LINK GOOD state and restarts Timer 5. Thus, the algorithm effectively waits until the link fails (e.g., the circuit has been disconnected for some reason). Once the link fails, the algorithm returns to the SENSE-PULSE cycle again.

The present invention is preferably implemented in a network switch. Referring to FIG. 13, a network switch 400 comprising a plurality of ports is shown therein. Each port is capable of communicating with self-powered DTE devices, cable-powered DTE devices and other network switches. Each port comprises a physical layer device configured to can determine if the network device it is communicating with is a self-powered DTE device or a cable-powered DTE device. Ports 420-1-420-8 are connected to an internal data bus. A CPU controls the communication among Ports A-H by controlling which ports have access to the data bus. Each port has a detector described above that can be connected to another network device via respective cable 18-n. In the example of FIG. 13, ports A and B are not connected to any device. Ports C and E are connected to IP telephones A 430-3 and B 430-5, respectively. Ports D, F, and G are connected to computers A 430-4, B 430-6, and C 430-7, respectively. Port H is connected to a facsimile machine 430-8.

In the default mode, each ports sends test signals to its respective device, and determine if the device connected thereto is a self-powered DTE device or cable-powered DTE device. In the example shown in FIG. 13 only IP telephone 430-3 is a cable-powered DTE device, and only port C 420-3 supplies power over data cable 18-3.

Each port a physical layer device arranged and constructed similarly to that shown in FIG. 2.

Although the detector is described in the context of a network switch, those skilled in the art will appreciate that the detector is likewise suitable for various other applications. Accordingly, the described exemplary application of the detector is by way of example only and not by way of limitation.

First Embodiment

The following is a detailed description for detecting whether the connected network device 12 (12') is a cable-powered DTE device or self-powered DTE device. In network device 10, signal generator 322 generates test signals for transmission by transmitter 312 over pair A of data cable 18, the test signal returns through filter 18 and pair B of data cable 18, receiver 314 to detector 324. If the network device 12' is a self-powered DTE device, as shown in FIG. 2B, or if there is an open circuit, detector 324 does not detect a return signal. As a result power is not supplied by network device 10 to network device 12' over data cable 18.

Referring to FIG. 3A, an exemplary test signal generated by signal generator 322 comprising plural pulses is illustrated. An initial pulse having a magnitude of −1 volt is applied for 752 ns followed by, positive pulses (1 volt) having a width of about 152 ns, negative (−1 volt) pulses having a width of approximately 72 ns and ending with a negative (−1 volt) pulse having a width of 304 ns. Successive test signals are spaced by at least 156 ms. It will be appreciated that the test signal in FIG. 3A is shown for illustrative purposes only and other appropriate test signals may be utilized.

FIG. 4A illustrates the test signal received by detector 324 when the length of the data cable is approximately zero meters and network device 10 is connected to cable-powered DTE device 12. The received test signal comprises a peak-to-peak voltage of about 1.25 volts. FIG. 5A illustrates the test signal received by detector 324 when the length of the data cable is approximately zero meters and the cable is short-circuited at the distal end thereof, with respect to network device 10. As can be seen in FIG. 5A, the difference between the maximum pulse and the minimum pulse received is approximately 2.25 volts.

FIG. 6A illustrates the test signal received by detector 324 when the length of the data cable is approximately 100 meters, and network device 10 is connected to cable-powered DTE device 12. The received test signal comprises a peak-to-peak voltage of about 0.4 volts. FIG. 7A illustrates the test signal received by detector 324 when the length of the data cable is approximately 100 meters and the cable is short circuited at the distal end thereof with respect to network device 10, the difference between the maximum pulse and the minimum pulse received is approximately 0.9 volts.

FIG. 8A illustrates the test signal received by detector 324 when the length of the data cable is approximately 150 meters of a cable-powered DTE device, and network device 10 is connected to cable-powered DTE device 12. The received test signal comprises a peak-to-peak voltage of about 0.35 volts. FIG. 9A illustrates the test signal received by detector 324 when the length of the data cable is approximately 150 meters and the cable is short circuited at the distal end thereof with respect to network device 10, the difference between the maximum pulse and the minimum pulse received is approximately 0.7 volts.

FIG. 18 is a graph of the differences between the maximum value of the three pulses and the minimum value of the three negative pulses (referred to hereinbelow as "peak-to-peak voltage") vs. the cable length for various conditions. The two plots with the largest peak-to-peak voltages are short circuit conditions for CAT5 and CAT3 cables, and the smallest are the two plots with the smallest voltage are the CAT5 and CAT3 cables connected to a cable-powered DTE device. As illustrated therein, for any specified length, a short-circuited cable will always have a higher peak-to-peak voltage than cable that is not short-circuited. A threshold value is preferably defined as the average peak-to-peak voltage of the short-circuited CAT3 cable and the CAT5 cable connected to a cable-powered DTE device for a specified length. It will be appreciated by one of ordinary skill in the art that other appropriately selected threshold values may be used so long as it is between the largest peak-to-peak voltages and the smallest peak-to-peak voltages.

FIG. 19 is a flow chart utilized implemented by detector 324 to detect whether network device 12 is a cable-powered device. In step 180, the test signal illustrated in FIG. 3A is generated by signal generator 322 and then transmitted by transmitter 312 over cable 18. A returned test signal is then received by receiver 314 and processed by detector 324. The length of cable 18 is determined by the phase difference between the transmitted and received signal (step 181). Once the distance is determined, the threshold voltage can be determined as a function cable length, which is empirically determined as discussed above. In the preferred embodiment, detector 324 comprises a memory or look up table for storing the threshold values (step 182). Alternatively, the threshold value may be calculated directly based the functional relationship between the voltage and cable length.

Still referring FIG. 19, detector 324 measures the peaks values of the three positive pulses of the test signal and determines which one has the largest value. Detector 324 further measures the relative minimum of the 2 negative pulses of the test signal and determines which one has the smallest value. Detector 324 determines the difference between the largest peak value and the smallest relative minimum to calculate the peak-to-peak voltage. It will be appreciated by one of ordinary skill in the art that other algorithms may be utilized to calculate the peak-to-peak voltage, such as, for example only, by calculating the difference between an average of the peak values and an average of the relative minima or by determining a difference between an arbitrary peak voltage and an arbitrary relative minimum voltage.

If detector 324 does not detect the test signal on cable 18, either network device 10 is connected to a self-power DTE device 12', there is no connection to network device 12, the distal end of cable 18 is not connected to any device or there is an open circuit (step 184). In any case, network device 12 does not supply power on cable 18 (step 187).

On the other hand if detector 324 detects a return signal, processing continues to step 185. In step 185, detector 324 determines if peak-to-peak voltage measured in step 183 is greater than the threshold determined in step 182. If so, cable 18 is either short-circuited or connected to another port in network device 10 or a device similar to network device 10. In either case, network device 12 does not supply power on cable 18 (step 187). Alternatively if the peak-to-peak voltage measured in step 183 is less than the threshold determined in step 182, network device 12 is a cable-powered DTE device and power controller 326 enables power supply 320. As such power is supplied on cable 18.

Second Embodiment

Referring to FIG. 3B, an exemplary test signal generated by signal generator 322 comprising plural pulses in accordance with the second embodiment is illustrated. The width of each positive pulse is about 150 ns, and the width of each negative pulse is approximately 70 ns. Successive test signals are spaced by at least 156 ms. When a cable powered DTE requiring power is not already being supplied with power, signal generator 322 generates test signals for transmission by transmitter 312 over pair A of data cable 18. The test signal returns through filter 18 and pair B of data cable 18, receiver 314 to detector 324. If the network device 12' is a self-powered DTE device or there is an open circuit, as shown in FIG. 2B, detector 324 does not detect a return signal. As a result power is not supplied by network device 10 to network device 12' over data cable 18.

FIG. 4B illustrates the test signal received by detector 324 when the length of the data cable is approximately zero meters and network device 10 is connected to cable-powered DTE device 12. The received test signal comprises two relative minima between the positive pulses to occur at in the range of approximately 0.7 to 0.8 volts which is significantly higher voltage levels than the level at which they were originally transmitted. FIG. 5B illustrates the test signal received by detector 324 when the length of the data cable is approximately zero meters and the cable is short-circuited at the distal end thereof, with respect to network device 10. As can be seen in FIG. 5B, the minima between the positive pulses, is approximately 0 volts.

FIG. 6B illustrates the test signal received by detector 324 when the length of the data cable is approximately 100 meters, and network device 10 is connected to cable-powered DTE device 12. The received test signal comprises two relative minima between the positive pulses to occur at in the range of approximately 0.3 to 0.38 volts. FIG. 7B illustrates the test signal received by detector 324 when the length of the data cable is approximately 100 meters and the cable is short circuited at the distal end thereof with respect to network device 10, the minima between the positive pulses, is in the range of approximately 0.0 to 0.1 volts.

FIG. 8B illustrates the test signal received by detector 324 when the length of the data cable is approximately 150 meters of a cable-powered DTE device, and network device 10 is connected to cable-powered DTE device 12. The received test signal comprises two relative minima between the positive pulses to occur at in the range of approximately 0.3 to 0.38 volts. FIG. 9B illustrates the test signal received by detector 324 when the length of the data cable is approximately 150 meters and the cable is short circuited at the distal end thereof with respect to network device 10, the minima between the positive pulses, is in the range of approximately 0.1 to 0.14 volts.

Detector 324 comprises a slicer and compares the received test signal with a threshold level that is above the original relative minima but lower than the relative minima of the returned pulse. Referring to FIG. 10B, detector 324 processes the received signal to have the resultant one of three signatures as follows. The short circuit signature comprises three positive pulses. The signature of open circuit or of a self-powered DTE device is a 0 volt signal. The signature of network device 10 (which detects a cable-powered DTE device) connected to a device similar to network device 10 has substantially same signature as a short circuit. The signature of the signal of a cable-powered DTE device is a single pulse.

As such, detector 324 is able to distinguish between an open circuit (either a self-powered DTE device, a disconnected cable or an open conductor in the cable), a cable-powered DTE device (when the relative minima of the received signal are above the threshold level) and a short circuit (when the relative minima of the received signal are less than the threshold level).

Autonegotiation

In 10BASE-T, 100 BASE-TX, and 1000BASE-T networks, the physical layer executes autonegotiation protocols that initiate the data link between the network devices. Once the data link is lost, the physical layer notifies the network device. The cable usually provides the physical connection between the physical layers of network devices.

During autonegotiation, autonegotiation signal including bursts of pulses called fast link pulse bursts (FLP) (each pulse in the burst is referred to as an NLP) are transmitted and received periodically by the physical layer. The purpose of the FLP bursts is to detect the presence of another network device and to initiate the exchange of data between the network devices. The initialization information typically includes configuration information such as the communication speed(s) that are available and other information that will be necessary for subsequent communications between the network devices.

When a physical layer of a network device is not connected to another network device, the physical layer still periodically transmits FLP bursts in an attempt to initiate connections to other network devices. FLP bursts usually include 17 to 33 link pulses that are generated every 16 ms. The physical layer remains powered up while attempting to connect to another network device. The autonegotiation function is defined more fully in IEEE 802.3, which is hereby incorporated by reference. In particular, Sections 22.2.4, 28, 32.5 and 40.5 of IEEE 802.3 address the autonegotiation capability. Referring now to FIG. 12, a physical layer 50 of a device includes an autonegotiation controller 52, a digital signal processor (DSP) 54 and other conventional physical layer circuits 58.

The inventors have observed that sometimes when performing the autonegotiation process, network device 10 may incorrectly attempt to complete autonegotiation with a cable-powered DTE device, which is not yet powered. In other words, in this situation in the SENSE state, shown in FIG. 11, network device 10 would send the autonegotiation FLP's and receive very similar FLP's. As a result network device 10 incorrectly believes that it has successfully autonegotiated. The inventors have determined that in cable-powered DTE devices 12, filter 352 may not be manufactured to specification (referred to hereinbelow as a "faulty filter" or "leaky filter"). These filters result in the FLP's not being completely filtered and network device 10 falsely autonegotiating. This problem is particularly exacerbated when the cable length is short. FIG. 14, illustrates the transmitted and received FLPs transmitted to a DTE device having a leaky filter.

The inventors propose a modification to the autonegotiation controller 52 to prevent false autonegotiation due to leaky filters in DTE devices. Autonegotiation controller 52 further comprises a counter circuit 522, windowing circuit 526 and a blinding circuit 524, and randomizer 528, the operation of which will be explained herein below.

FIG. 17 is a flow chart of the process implemented by autonegotiation controller 52 during the SENSE state shown in FIG. 11. Autonegotiation controller 52 initiates the transmission of the FLP's as described above (step 1204). Autonegotiation controller 52 then analyzes the received signal, if any. The received signal is compared to the transmitted NLP's, if the received signal does not contains the same number NLP's in the FLP transmitted within a window, and then the autonegotiation process continues. On the other hand if the received signal contains the same number of NLPs in the FLP, the network device still must determine whether it is autonegotiating with a self-powered network device or a cable-powered DTE device, which has a leaky filter. This is preferably implemented by counter circuit 522 counting both the number of NLPs transmitted (step 1206) and the number of pulses received within a window established by windowing circuit 526 (step 1208). FIG. 16A is an example of the NLP's being received within the window, and FIG. 16B is an example of some other signal being received. This other signal may be autonegotiation pulses generated by network device 12.

Referring back to FIG. 17, if the number of NLP's transmitted does not equal the number of received pulses (step 1210) then blinding circuit 524 is disabled (step 1218) and autonegotiation continues.

Alternatively in step 1210 if the number of NLP's transmitted equals the number of received pulses within the window, the autonegotiation process still is not certain whether it is autonegotiating with a self-powered network device or a cable-powered DTE device. The blinding circuit 524 is then enabled. When enabled, the blinding circuit 524 prevents the autonegotiation controller 52 from autonegotiating. (As noted above the blinding circuit 524 is enabled until the number of received pulses does not equal the number of transmitted NLPs within a window.) The timing between the next FLP bursts is randomized (step 1214) by randomizer 528. As noted above the normal timing between FLP bursts is 16 ms. Randomizer 528 randomly changes the timing between FLP bursts from 14 ms and 16 ms. The randomization will tend to eliminate network device 1—from counting pulses within the window from network device 12, which is attempting to autonegotiate with network device 10. In this situation the NLP's generated from network device 12 are coincidentally being received within the window. After the randomization the autonegotiation process is repeated. If the blinding circuit remains enabled sufficient enough time to cause timer 1 (130 ms) to time out (that is if the number of transmitted NLPs remains equal the number of received pulses), then the process exits the SENSE state and enters the PULSE state. In other words, the autonegotiation controller has detected that network device 12 contains a leaky filter, and start the detection states.

The blinding mode also facilitates detecting a cable-powered network device while in the sleep mode. An example of the sleep mode is discussed in commonly-assigned and copending patent application entitled "Apparatus for Automatic Energy Savings Mode For Ethernet Transceivers and Method Thereof" filed on Nov. 21, 2001 and assigned Ser. No. 09/990,137, the contents of which are incorporated by reference.

It is hereby noted that the best mode of the present invention entails the use of an Ethernet data transmission system, including Ethernet transmitters and receivers. However, while the present invention has been described with respect to what is presently considered to be the preferred embodiment, i.e., an implementation in an Ethernet system, it is to be understood that the invention is not limited to the disclosed embodiments. To the contrary, the invention is intended to cover various modifications and equivalent arrangements included within the spirit and scope of the appended claims. For example, it is to be understood that the invention is applicable to other types of data communication circuitry. The invention also may be implemented via an appropriately programmed general purpose computer. The scope of the following claims is to be accorded the broadest interpretation so as to encompass all such modifications and equivalent structures and functions.

What is claimed is:

1. A physical layer device of a first network device, the physical layer device comprising:
   a transmitter configured to transmit an autonegotiation signal to a second network device;
   a receiver configured to receive a received signal from the second network device; and
   an autonegotiation controller configured to autonegotiate link parameters for a link between the first network device and the second network device,
   wherein the autonegotiation controller selectively blinds autonegotiation based on results of a comparison between (i) autonegotiation pulses in the autonegotiation signal (ii) autonegotiation pulses in the received signal having been received during a window.

2. The physical layer device of claim 1, wherein:
   the autonegotiation controller further comprises a counter; and
   the counter counts (i) a first number of the autonegotiation pulses in the autonegotiation signal and (ii) a second number of the autonegotiation pulses in the received signal having been received during the window.

3. The physical layer device of claim 2, wherein the autonegotiation controller blinds autonegotiation when the first number of pulses equals the second number of pulses.

4. The physical layer device of claim 1, wherein in response to the first number of pulses not being equal to the second number of pulses, the autonegotiation controller enables autonegotiation.

5. The physical layer device of claim 1, wherein the autonegotiation controller comprises a windowing circuit configured to determine the window.

6. The physical layer device of claim 1, wherein:
the autonegotiation controller comprises a detector;
the detector detects whether the second network device requires supply power;
the autonegotiation controller enables the detector when autonegotiation is blinded for a period greater than a predetermined period; and
the predetermined period is greater than a period of the window.

7. The physical layer device of claim 6, wherein the autonegotiation controller maintains the detector in a disabled state when the autonegotiation is blinded for less than or equal to the predetermined period.

8. The physical layer device of claim 1, wherein:
the autonegotiation controller includes a randomizer; and
the randomizer randomizes timing of the autonegotiation signal when autonegotiation is blinded.

9. A physical layer device of a first network device, the physical layer device comprising:
a transmitter configured to transmit an autonegotiation signal to a second network device;
a receiver configured to receive a received signal from the second network device; and
an autonegotiation controller configured to autonegotiate link parameters for a link between the first network device and the second network device,
wherein the autonegotiation controller comprises:
a comparing circuit configured to compare (i) a first number of autonegotiation pulses in the autonegotiation signal to (ii) a second number of autonegotiation pulses in the received signal having been received during a window; and
a blinding circuit configured to selectively blind autonegotiation in the autonegotiation controller based on the comparison.

10. The physical layer device of claim 9, wherein the comparing circuit includes a counter.

11. The physical layer device of claim 9, wherein the blinding circuit blinds autonegotiation when the first number of pulses equals the second number of pulses during the window.

12. The physical layer device of claim 9, wherein in response to the first number of pulses not being equal to the second number of pulses during the window, the autonegotiation controller enables autonegotiation.

13. The physical layer device of claim 9, wherein:
the autonegotiation controller comprises a windowing circuit; and
the windowing circuit identifies the window.

14. The physical layer device of claim 9, wherein:
the autonegotiation controller comprises a detector;
the detector determines whether the second network device requires supply power;
the autonegotiation controller enables the detector when autonegotiation is blinded for a period greater than a predetermined period; and
the predetermined period is greater than a period of the window.

15. The physical layer device of claim 9, wherein the autonegotiation controller enables autonegotiation when the autonegotiation signal is different than the received signal.

16. The physical layer device of claim 9, wherein:
the autonegotiation controller includes a randomizer; and
the randomizer randomizes timing of the autonegotiation signal when autonegotiation is blinded.

* * * * *